US012710219B2

(12) United States Patent
Lee et al.

(10) Patent No.: US 12,710,219 B2
(45) Date of Patent: Aug. 18, 2026

(54) REFRIGERATOR AND CONTROL METHOD THEREOF

(71) Applicant: SAMSUNG ELECTRONICS CO., LTD., Suwon-si (KR)

(72) Inventors: Chomin Lee, Suwon-si (KR); Seangwon Lee, Suwon-si (KR); Jaejin Lee, Suwon-si (KR); Hojune Jeon, Suwon-si (KR); Donghyun Chun, Suwon-si (KR); Jeonghun Shin, Suwon-si (KR); Wooyeol Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 299 days.

(21) Appl. No.: 18/235,665

(22) Filed: Aug. 18, 2023

(65) Prior Publication Data

US 2024/0053088 A1 Feb. 15, 2024

Related U.S. Application Data

(63) Continuation of application No. PCT/KR2023/011334, filed on Aug. 2, 2023.

(30) Foreign Application Priority Data

Aug. 11, 2022 (KR) ........................ 10-2022-0100903
Nov. 21, 2022 (KR) ........................ 10-2022-0156774

(51) Int. Cl.
*F25D 23/02* (2006.01)
*E05F 15/614* (2015.01)

(52) U.S. Cl.
CPC .......... *F25D 23/028* (2013.01); *E05F 15/614* (2015.01); *E05Y 2201/426* (2013.01); *E05Y 2900/31* (2013.01); *F25D 2323/021* (2013.01)

(58) Field of Classification Search
CPC .. F25D 23/028; F25D 2700/02; F25D 29/005; F25D 23/02; F25D 2323/021;
(Continued)

(56) References Cited

U.S. PATENT DOCUMENTS 8,297,725 B2 10/2012 Kim et al.
8,454,102 B2 6/2013 Kim
(Continued)

FOREIGN PATENT DOCUMENTS

CN 109826926 B 11/2020
CN 113445846 A 9/2021
(Continued)

OTHER PUBLICATIONS

KR20100003347U translation (Year: 2010).*
(Continued)

*Primary Examiner* — Hiwot E Tefera
(74) *Attorney, Agent, or Firm* — Sughrue Mion, PLLC

(57) ABSTRACT

A control method of a refrigerator includes: in response to receiving a user input, driving a motor in a forward direction until a first push rod reaches a maximum forward position from a neutral position; performing at least one of stopping the motor or driving the motor in a reverse direction at a first reference driving speed before a predetermined waiting time elapses from when the first push rod reaches the maximum forward position; driving the motor in the reverse direction at a second reference driving speed until the first push rod returns to the neutral position after the predetermined waiting time elapses from when the first push rod reaches the maximum forward position; and changing the predetermined waiting time in response to receiving a user input while the motor is driven in the forward direction until the first push rod reaches the maximum forward position from the neutral position.

17 Claims, 18 Drawing Sheets

(58) Field of Classification Search
CPC ............ F25D 2323/024; F25D 2323/02; E05F 15/616; E05F 15/614; E05F 15/619; E05F 15/60; E05Y 2400/32; E05Y 2201/426; E05Y 2201/686; E05Y 2900/31
See application file for complete search history.

(56) References Cited

U.S. PATENT DOCUMENTS

| | | | | |
|---|---|---|---|---|
| 9,739,523 | B1 * | 8/2017 | Augsburger | E05D 3/02 |
| 10,900,271 | B2 * | 1/2021 | Eom | E05F 15/614 |
| 11,029,078 | B2 | 6/2021 | Lee et al. | |
| 11,448,000 | B2 | 9/2022 | Cheng et al. | |
| 2008/0134698 | A1 * | 6/2008 | Cho | F25D 23/028 62/449 |
| 2011/0048060 | A1 * | 3/2011 | Kim | E05B 17/0029 62/449 |
| 2011/0083461 | A1 * | 4/2011 | Kim | E05F 15/619 62/449 |
| 2011/0087376 | A1 * | 4/2011 | Kim | E05B 17/0029 700/275 |
| 2014/0259529 | A1 * | 9/2014 | Jenkinson | E05D 7/0027 16/248 |
| 2016/0312513 | A1 * | 10/2016 | Heydel | E05F 15/614 |
| 2017/0260794 | A1 * | 9/2017 | Son | E05F 15/614 |
| 2017/0336132 | A1 * | 11/2017 | Chang | F25D 23/028 |
| 2018/0119475 | A1 * | 5/2018 | Kim | E05F 15/614 |
| 2018/0128537 | A1 * | 5/2018 | Kim | E05F 15/635 |
| 2018/0187470 | A1 * | 7/2018 | Song | F25D 23/087 |
| 2018/0347892 | A1 * | 12/2018 | Kim | E05F 15/619 |
| 2019/0162006 | A1 * | 5/2019 | Lee | F25D 23/02 |
| 2019/0162467 | A1 * | 5/2019 | Lee | F25D 29/006 |

FOREIGN PATENT DOCUMENTS

| | | | |
|---|---|---|---|
| EP | 3564603 | A1 | 11/2019 |
| JP | 7037599 | B2 | 3/2022 |
| KR | 10-2009-0080346 | A | 7/2009 |
| KR | 20-2010-0003347 | U | 3/2010 |
| KR | 10-2010-0064022 | A | 6/2010 |
| KR | 20-0449998 | Y1 | 8/2010 |
| KR | 10-1039367 | B1 | 6/2011 |
| KR | 10-1537377 | B1 | 7/2015 |
| KR | 10-1639435 | B1 | 7/2016 |
| KR | 10-1871057 | B1 | 6/2018 |
| KR | 10-1972547 | B1 | 4/2019 |
| KR | 10-2020-0045798 | A | 5/2020 |
| KR | 10-2020-0070620 | A | 6/2020 |

OTHER PUBLICATIONS

JP7037599 translation (Year: 2022).*
KR20200070620 translation (Year: 2020).*
International Search Report (PCT/ISA/210) and Written Opinion (PCT/ISA/237) issued by the International Searching Authority on Nov. 21, 2023 in corresponding International Application No. PCT/KR2023/011334.

* cited by examiner

REFRIGERATOR AND CONTROL METHOD THEREOF

CROSS-REFERENCE TO RELATED APPLICATION(S)

This application is a continuation application, under 35 U.S.C. § 111(a), of international application No. PCT/KR2023/011334, filed on Aug. 2, 2023, which claims priority to Korean Patent Applications No. 10-2022-0100903, filed on Aug. 11, 2022, and No. 10-2022-0156774, filed on Nov. 21, 2022 in the Korean Intellectual Property Office, the disclosure of which is incorporated by reference herein in their entireties.

BACKGROUND

Technical Field

The disclosure relates to a refrigerator and a control method thereof, and more particularly, to a refrigerator including a door opening device configured to open a door and a control method thereof.

Background Art

A refrigerator is a home appliance that keeps food fresh by including a main body including a storage compartment, a cold air supply device configured to supply cold air to the storage compartment, and a door configured to open and close the storage compartment.

The refrigerator may be provided with a door opening device that helps to open the door comfortably. When the door is closed, air inside the storage compartment may be cooled, and a temperature difference between the inside and outside of the storage compartment may occur. Accordingly, a pressure difference between the inside and outside of the storage compartment may occur. In addition, when the door is closed, the door is in close contact with the main body through a gasket containing a magnet. Therefore, when opening the door, a lot of force may be required at an initial stage of opening.

When a user operates a switch, the door opening device may push a rear surface of the door, thereby opening the door at a predetermined angle. Accordingly, the user can open the door with little force.

SUMMARY

Technical Field

Therefore, it is an aspect of the disclosure to provide a refrigerator including a door opening device capable of opening a plurality of doors arranged in left and right directions, and a control method thereof.

It is another aspect of the disclosure to provide a refrigerator including a door opening device including a plurality of push rods configured to be moved to press a rear surface of a plurality of doors, and a single motor configured to supply a driving force to allow the plurality of push rods to be interlocked with each other and to be moved in opposite directions, and a control method thereof.

Technical Solution

In accordance with an aspect of the disclosure, a control method of a refrigerator that may include a main body, a first door, a second door, a door opening device, a first switch, a second switch, and a speaker, the main body including a storage compartment, the first door and the second door being rotatably coupled to the main body and being disposed in left and right directions so as to open and close the storage compartment, the door opening device including a motor configured to allow a first push rod and a second push rod to be interlocked with each other and moved in opposite directions, the first push rod being configured to press the first door, the second push rod being configured to press the second door, the first switch and the second switch being configured to receive a user input, the speaker being configured to generate a notification sound, may include, in response to receiving a user input from the first switch, driving the motor in a forward direction until the first push rod reaches a maximum forward position of the first push rod from a neutral position of the first push rod, performing at least one of stopping the motor or driving the motor in a reverse direction at a first reference driving speed before a predetermined waiting time elapses from when the first push rod reaches the maximum forward position of the first push rod, driving the motor in the reverse direction at a second reference driving speed until the first push rod returns to the neutral position of the first push rod after the predetermined waiting time elapses from when the first push rod reaches the maximum forward position of the first push rod, and changing the predetermined waiting time in response to receiving a user input from the second switch while the motor is driven in the forward direction until the first push rod reaches the maximum forward position of the first push rod from the neutral position of the first push rod.

The predetermined waiting time may be initially set as a first reference waiting time. In response to receiving a user input from the second switch while the motor is driven in the forward direction until the first push rod reaches the maximum forward position of the first push rod from the neutral position of the first push rod, the predetermined waiting time may be changed from the first reference waiting time to a second reference waiting time less than the first reference waiting time.

The second reference driving speed may be greater than the first reference driving speed.

The performing of the at least one of stopping the motor or driving the motor in the reverse direction at the first reference driving speed before the predetermined waiting time elapses from when the first push rod reaches the maximum forward position of the first push rod may include stopping the motor throughout the predetermined waiting time from when the first push rod reaches the maximum forward position of the first push rod.

The performing of the at least one of stopping the motor or driving the motor in the reverse direction at the first reference driving speed before the predetermined waiting time elapses from when the first push rod reaches the maximum forward position of the first push rod may include driving the motor in the reverse direction at the first reference driving speed throughout the predetermined waiting time from when the first push rod reaches the maximum forward position of the first push rod.

The performing of the at least one of stopping the motor or driving the motor in the reverse direction at the first reference driving speed before the predetermined waiting time elapses from when the first push rod reaches the maximum forward position of the first push rod may include stopping the motor for the second reference waiting time from when the first push rod reaches the maximum forward position of the first push rod, and driving the motor in the reverse direction at the first reference speed for a third reference waiting time, which is a difference between the first reference waiting time and the second reference waiting time, after the second reference waiting time elapses from when the first push rod reaches the maximum forward position of the first push rod.

The first reference waiting time and the second reference waiting time may be set by a user.

The control method may further include, in response to receiving a user input from the second switch while the motor is driven in the forward direction until the first push rod reaches the maximum forward position of the first push rod from the neutral position of the first push rod, driving the motor in the reverse direction at the second reference driving speed until the second push rod reaches a maximum forward position of the second push rod from a neutral position of the second push rod.

Driving the motor in the reverse direction at the second reference driving speed until the first push rod returns to the neutral position of the first push rod, and driving the motor in the reverse direction at the second reference driving speed until the second push rod reaches the maximum forward position of the second push rod from the neutral position of the second push rod may be continuously performed.

The control method may further include changing the predetermined waiting time in response to receiving a user input from the second switch while the at least one of stopping the motor or driving the motor in the reverse direction at the first reference driving speed is performed before the predetermined waiting time elapses from when the first push rod reaches the maximum forward position of the first push rod.

The control method may further include outputting a notification sound through the speaker in response to receiving a user input from the second switch while the motor is driven in the forward direction until the first push rod reaches the maximum forward position of the first push rod from the neutral position of the first push rod.

The control method may further include outputting a notification sound through the speaker in response to receiving a user input from the second switch while the at least one of stopping the motor or driving the motor in the reverse direction at the first reference driving speed is performed before the predetermined waiting time elapses from when the first push rod reaches the maximum forward position of the first push rod.

In accordance with another aspect of the disclosure, a control method of a refrigerator including a main body including a storage compartment, a first door and a second door rotatably coupled to the main body and disposed in left and right directions so as to open and close the storage compartment, a door opening device including a motor configured to allow a first push rod configured to press the first door and a second push rod configured to press the second door, to be interlocked with each other and moved in opposite directions, a first switch and a second switch configured to receive a user input, and a speaker configured to generate a notification sound, the control method includes, in response to receiving a user input from the first switch, driving the motor in a forward direction until the first push rod reaches a maximum forward position of the first push rod from a neutral position of the first push rod, performing at least one of stopping the motor or driving the motor in a reverse direction at a first reference driving speed before a predetermined waiting time elapses from when the first push rod reaches the maximum forward position of the first push rod, driving the motor in the reverse direction at a second reference driving speed until the first push rod returns to the neutral position of the first push rod after the predetermined waiting time elapses from when the first push rod reaches the maximum forward position of the first push rod, and outputting a notification sound through the speaker in response to receiving a user input from the second switch while the motor is driven in the forward direction until the first push rod reaches the maximum forward position of the first push rod from the neutral position of the first push rod.

The second reference driving speed may be greater than the first reference driving speed.

The control method may further include outputting a notification sound through the speaker in response to receiving a user input from the second switch while the at least one of stopping the motor or driving the motor in the reverse direction at the first reference driving speed is performed before the predetermined waiting time elapses from when the first push rod reaches the maximum forward position of the first push rod.

In accordance with another aspect of the disclosure, a refrigerator includes a main body including a storage compartment, a first door and a second door rotatably coupled to the main body and disposed in left and right directions so as to open and close the storage compartment, a door opening device including a first push rod configured to move so as to press a rear surface of the first door, a second push rod configured to move so as to press a rear surface of the second door, and a motor configured to allow the first push rod and the second push rod to be interlocked with each other and moved in opposite directions, and configured to be driven in a forward and reverse direction, a first switch configured to receive a user input for opening the first door, a second switch configured to receive a user input for opening the second door, a speaker configured to output a notification sound, and a controller configured to control the motor and the speaker. The controller is configured to, in response to receiving a user input from the first switch, drive the motor in the forward direction until the first push rod reaches a maximum forward position of the first push rod, configured to perform at least one of stopping the motor or driving the motor in a reverse direction at a first reference driving speed before a predetermined waiting time elapses from when the first push rod reaches the maximum forward position of the first push rod, configured to drive the motor in the reverse direction at a second reference driving speed until the first push rod returns to the neutral position of the first push rod after the predetermined waiting time elapses from when the first push rod reaches the maximum forward position of the first push rod, and configured to change the predetermined waiting time in response to receiving a user input from the second switch while the motor is driven in the forward direction until the first push rod reaches the maximum forward position of the first push rod from the neutral position of the first push rod. The controller is configured to output a notification sound through the speaker in response to receiving a user input from the second switch while the motor is driven in the forward direction until the first push rod reaches the maximum forward position of the first push rod from the neutral position of the first push rod.

The door opening device may include a position detection sensor configured to detect a position of one of the first push rod and the second push rod.

The refrigerator may include an opening and closing sensor configured to detect whether the first door and the second door are opened or closed. The controller may be configured to drive the motor to allow the first push rod and the second push rod to align with each other based on position information of the first push rod and the second push rod detected by the position detection sensor, and opening and closing information of the first door and the second door detected by the opening and closing sensor.

The refrigerator may include a hinge arranged on a lower end of the main body to rotatably support the first door, and a cam unit configured to allow the first door to be closed by its own weight in response to the first push rod moving from the maximum forward position of the first push rod to the neutral position of the first push rod by the motor driven in the reverse direction, the cam unit including a door cam arranged on a lower end of the first door, and a hinge cam arranged in the hinge to correspond to the door cam.

Advantageous Effects

As is apparent from the above description, because a plurality of push rods for opening a plurality of doors is interlocked and driven by a single motor, it is possible to reduce material costs and simplify an assembly structure.

Further, when a command to withdraw the other push rod is input in a state in which one of a plurality of push rods is withdrawn and the other push rod is inserted, it may be difficult for a user to recognize a delay time until the other push rod is withdrawn.

The effects of the present disclosure are not limited to those mentioned above, and other effects not mentioned will be apparent from the following description to one of ordinary skill in the art to which the present disclosure belongs.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
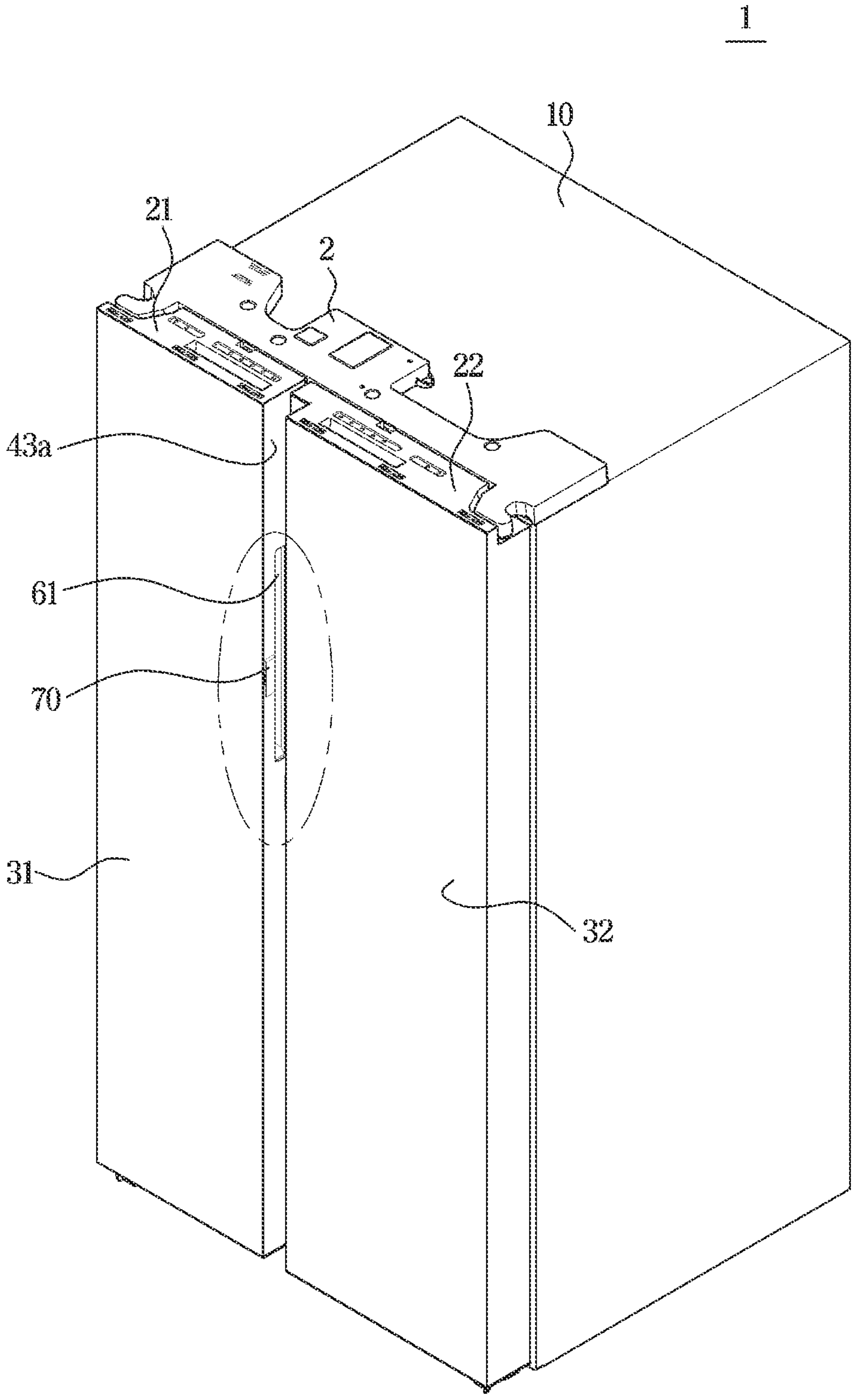
FIG. 1 is a view illustrating an appearance of a refrigerator according to an embodiment of the disclosure.

The various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless they are definitely different in a context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

The term of "and/or" includes a plurality of combinations of relevant items or any one item among a plurality of relevant items.

Herein, the expressions "a first", "a second", "the first", "the second", etc., may simply be used to distinguish an element from other elements, but is not limited to another aspect (e.g., importance or order) of elements.

In the following detailed description, the terms of "front surface", "rear surface", "upper surface", "lower surface", "side surface" "left side", "right side", "upper portion", "lower portion" and the like may be defined by the drawings, but the shape and the location of the component is not limited by the term.

In this disclosure, the terms "including", "including", and the like are used to specify features, numbers, steps, operations, elements, elements, or combinations thereof, but do not preclude the presence or addition of one or more of the features, elements, steps, operations, elements, elements, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" another element, this includes not only when the element is in contact with the other element, but also when there is another element between the two elements.

According to an embodiment, a refrigerator may include a main body.

The "main body" may include an inner case and an outer case disposed outside the inner case, and an insulating material provided between the inner case and the outer case.

The "inner case" may include at least one of a case, a plate, a panel or a liner that forms a storage compartment. The inner case may be formed as a single body or may be formed by assembling a plurality of plates. The "outer case" may form an exterior of the main body, and may be coupled to the outer side of the inner case to allow the insulating material to be disposed between the inner case and the outer case.

The "insulating material" may insulate the inside and outside of the storage compartment to allow a temperature inside the storage compartment to be maintained at a set appropriate temperature without being affected by the external environment of the storage compartment. According to an embodiment, the insulating material may include a foam insulating material. The foam insulating material may be molded by injecting and foaming urethane foam, in which polyurethane and a foaming agent are mixed, between the inner and outer cases.

According to an embodiment, the insulating material may include a vacuum insulating material in addition to the foam insulating material, or the insulating material may include only a vacuum insulating material instead of the foam insulating material. The vacuum insulating material may include a core material and an outer material that accommodates the core material and seals an inside with a vacuum or a pressure close to the vacuum. However, the insulating material is not limited to the above-described foam insulating material or vacuum insulating material, and may include various materials that may be used for insulation.

The "storage compartment" may include a space defined by the inner case. The storage compartment may further include an inner case provided to define a space corresponding to the storage compartment. Various items such as food, medicines or cosmetics may be stored in the storage compartment, and the storage compartment may be formed to allow at least one side thereof to be opened in order to take in and out of item.

The refrigerator may include one or more storage compartments. When two or more storage compartments are formed in the refrigerator, each storage compartment may have a different purpose and may be maintained at different temperatures. For this, each of the storage compartments may be partitioned from each other by a partition wall including the insulating material.

The storage compartment may be provided to be maintained in an appropriate temperature range according to the purpose, and may include a "refrigerating compartment", a "freezing compartment" or a "variable temperature compartment" which are classified according to the purpose and/or temperature range. The refrigerating compartment may be maintained at a temperature suitable for storing food in a refrigerating manner, and the freezing compartment may be maintained at a temperature suitable for storing food in a freezing manner. "Refrigerating" may mean to cool food to the extent that it does not freeze, and as an example, the refrigerating compartment may be maintained in the range of 0 degrees Celsius to 7 degrees Celsius. "Freezing" may mean to freeze or cool food to remain frozen, and as an example, the freezing compartment may be maintained in the range of minus 20 degrees Celsius to minus 1 degree Celsius. The variable temperature compartment may be used as either the refrigerating compartment or the freezing compartment according to a user's choice or regardless of a user's choice.

The storage compartment may be called "vegetable compartment", "fresh compartment", "cooling compartment" and "ice making compartment" in addition to names such as "refrigerating compartment", "freezing compartment" and "variable temperature compartment". Terms such as "refrigerating compartment", "freezing compartment" and "variable temperature compartment" should be understood as encompassing storage compartments including corresponding uses and temperature ranges, respectively.

According to an embodiment, the refrigerator may include at least one door configured to open and close the open side of the storage compartment. The door may be configured to open and close each of one or more storage compartments, or a single door may be provided to open and close a plurality of storage compartments. The door may be rotatably or slidably installed on a front surface of the main body.

The "door" may be configured to seal the storage compartment when the door is closed. In the similar manner as the main body, the door may include the insulating material to insulate the storage compartment when the door is closed.

According to an embodiment, the door may include a door outer plate forming a front surface of the door, a door inner plate forming a rear surface of the door and facing the storage compartment, an upper cap, a lower cap, and a door insulating material provided therein.

A gasket may be provided at an edge of the door inner plate to seal the storage compartment by being in close contact with the front surface of the main body when the door is closed. The door inner plate may include a dyke protruding backward to mount a door basket provided to store items.

According to an embodiment, the door may include a door body and a front panel detachably coupled to the front side of the door body and forming the front side of the door. The door body may include a door outer plate forming the front surface of the door body, a door inner plate forming the rear surface of the door body and facing the storage compartment, an upper cap, a lower cap, and a door insulating material provided therein.

The refrigerator may be classified into French door type, side-by-side type, Bottom Mounted Freezer (BMF) type, Top Mounted Freezer (TMF) type, or single door refrigerator according to the arrangement of doors and storage compartments.

The refrigerator according to an embodiment may include a cold air supply device configured to supply cold air to the storage compartment.

The "cold air supply device" may include a machine, an appliance, an electronic device, and/or a system corresponding to a combination thereof, which are capable of generating cold air and guiding the cold air to cool the storage compartment.

According to an embodiment, the cold air supply device may generate cold air through a refrigeration cycle including compression, condensation, expansion, and evaporation of a refrigerant. For this, the cold air supply device may include a refrigeration cycle device including a compressor, a condenser, an expansion device, and an evaporator capable of driving the refrigeration cycle. According to an embodiment, the cold air supply device may include a semiconductor such as a thermoelectric element. The thermoelectric element may cool the storage compartment by heating and cooling operations through the Peltier effect.

According to an embodiment, the refrigerator may include a machine room in which at least some components belonging to the cold air supply device are disposed.

The "machine room" may be provided to be partitioned and insulated from the storage compartment in order to prevent heat, which is generated from components disposed in the machine room, from being transferred to the storage compartment. The inside of the machine room may be configured to communicate with the outside of the main body so as to dissipate heat from components disposed inside the machine room.

According to an embodiment, the refrigerator may include a dispenser arranged at the door to supply water and/or ice. The dispenser may be provided on the door to allow a user to access the dispenser without opening the door.

According to an embodiment, the refrigerator may include an ice maker configured to generate ice. The ice maker may include an ice tray to store water, an ice separator to separate ice from the ice tray, and an ice bucket to store ice generated in the ice tray.

According to an embodiment, the refrigerator may include a controller for controlling the refrigerator.

The "controller" may include a memory configured to store or memorize a program and/or data for controlling the refrigerator, and a processor configured to output a control signal for controlling the cold air supply device according to the program and/or data stored in the memory.

The memory stores or records various information, data, commands, programs, etc. necessary for the operation of the refrigerator. The memory may store temporary data generated while generating control signals for controlling components included in the refrigerator. The memory may include at least one of volatile memory and non-volatile memory, or a combination thereof.

The processor controls the overall operation of the refrigerator. The processor may execute a program stored in the memory to control components of the refrigerator. The processor may include a separate NPU that performs the operation of the artificial intelligence model. Further, the processor may include a central processing unit, a dedicated graphics processor (GPU), and the like. The processor may generate a control signal for controlling the operation of the cold air supply station. For example, the processor may receive temperature information of the storage compartment from a temperature sensor and generate a cooling control signal for controlling the operation of the cold air supply device based on the temperature information of the storage compartment.

The processor may process a user input of a user interface according to a program and/or data memorized/stored in the memory, and control the operation of the user interface. The user interface may be provided using an input interface and an output interface. The processor may receive a user input from the user interface, and transmit a display control signal and image data, which is for displaying an image on the user interface, to the user interface in response to the user input.

The processor and memory may be provided integrally or separately. The processor may include one or more processors. For example, the processor may include a main processor and at least one sub-processor. The memory may include one or more memories.

According to an embodiment, the refrigerator may include a processor and a memory for controlling all components included in the refrigerator, and may include a plurality of processors and a plurality of memories individually controlling components of the refrigerator. For example, the refrigerator may include a processor and a memory that control an operation of the cold air supply device according to an output of the temperature sensor. In addition, the refrigerator may separately include a processor and a memory that control the operation of the user interface according to a user input.

A communication module may communicate with an external device such as a server, a mobile device, or other home appliance through a peripheral access point (AP). The access point (AP) may connect a local area network (LAN), to which the refrigerator or the user device is connected, to a wide area network (WAN) to which the server is connected. The refrigerator or user device may be connected to the server through the wide area network (WAN).

The input interface may include a key, a touch screen, a microphone, and the like. The input interface may receive a user input and transmit the user input to the processor.

The output interface may include a display, a speaker, and the like. The output interface may output various notifications, messages, information, etc. generated by the processor.

Reference will now be made in detail to embodiments of the disclosure, examples of which are illustrated in the accompanying drawings.

Figure 2:
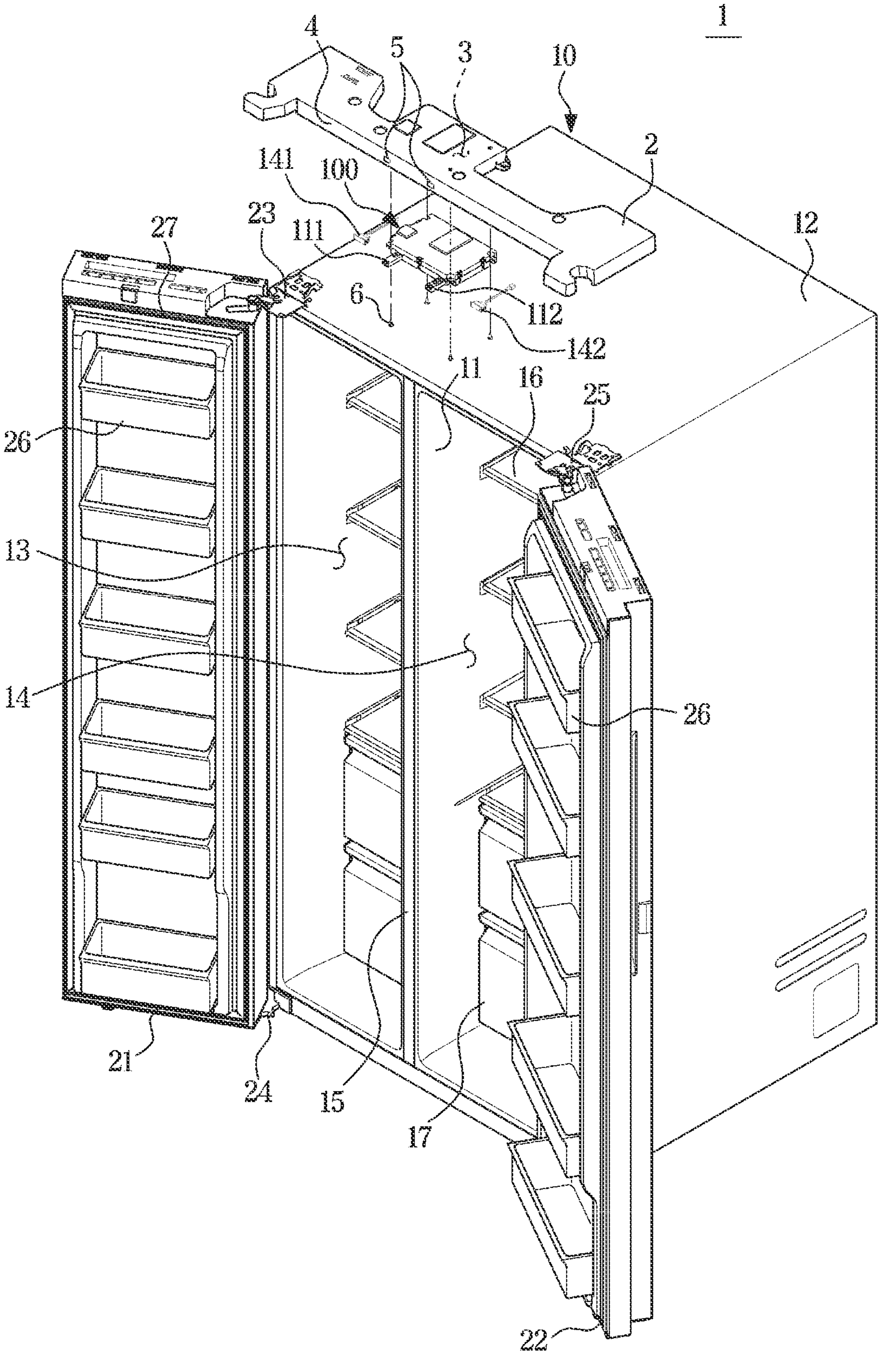
FIG. 2 is a view illustrating a state in which a door of the refrigerator is opened and a door opening device is separated according to an embodiment of the disclosure.
Figure 3:
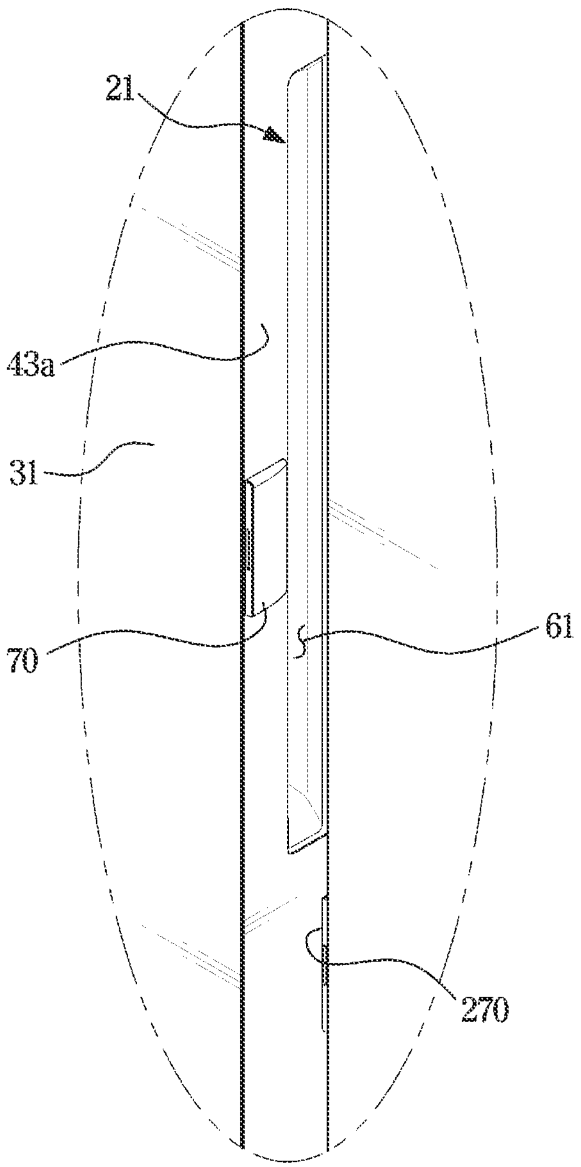
FIG. 3 is an enlarged view of a dotted line portion of FIG. 1, particularly, an enlarged view of a handle of a first door and a switch of the first door according to an embodiment of the disclosure.
Figure 4:
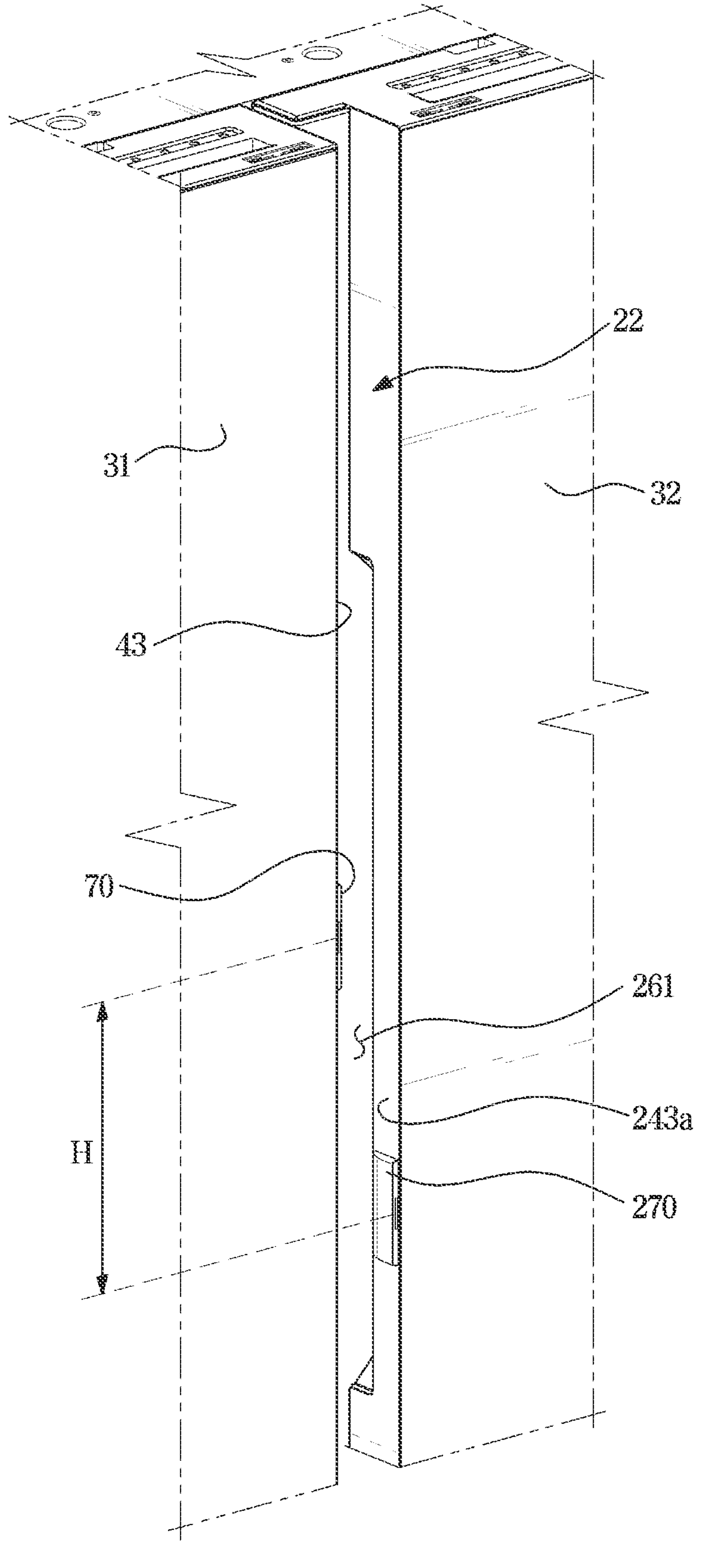
FIG. 4 is a view illustrating a comparison between the switch of the first door and a switch of a second door according to an embodiment of the disclosure.

FIG. 1 is a view illustrating an appearance of a refrigerator according to an embodiment of the disclosure. FIG. 2 is a view illustrating a state in which a door of the refrigerator is opened and a door opening device is separated according to an embodiment of the disclosure. FIG. 3 is an enlarged view of a dotted line portion of FIG. 1, particularly, an enlarged view of a handle of a first door and a switch of the first door according to an embodiment of the disclosure. FIG. 4 is a view illustrating a comparison between the switch of the first door and a switch of a second door according to an embodiment of the disclosure.

Referring to FIGS. 1 to 4, the refrigerator 1 according to an embodiment may include a main body 10, storage compartments 13 and 14 formed inside the main body 10, doors 21 and 22 configured to open the storage compartments 13 and 14, and a cold air supply device (not shown) configured to supply cold air to the storage compartments 13 and 14.

The main body 10 may include an inner case 11 forming the storage compartments 13 and 14, an outer case 12 coupled to the outside of the inner case 11 to form an exterior, and an insulating material (not shown) provided between the inner case 11 and the outer case 12 to insulate the storage compartments 13 and 14.

The storage compartments 13 and 14 may be partitioned into a storage compartment 13 on the left side and a storage compartment 14 on the right side by a vertical partition wall 15. The storage compartment 13 on the left side may be used as a freezing compartment, and the storage compartment 14 on the right side may be used as a refrigerating compartment. However, the division and use of the storage compartments 13 and 14 as described above is only an example, and is not limited thereto.

A shelf 16 on which an item is placed and a storage container 17 for storing an item may be provided in the storage compartments 13 and 14.

The cold air supply device may generate cold air using a refrigeration circulation cycle of compressing, condensing, expanding, and evaporating a refrigerant, and supply the generated cold air to the storage compartments 13 and 14.

The refrigerator 1 according to an embodiment may include the doors 21 and 22 configured to open and close the storage compartments 13 and 14. The door 21 on the left may open and close the storage compartment 13 on the left side, and the door 22 on the right may open and close the storage compartment 14 on the right side.

The doors 21 and 22 may be rotatably coupled to the main body 10. Hinges 23, 24, and 25 may be provided in the main body 10 to rotatably couple the doors 21 and 22 to the main body 10. The left door 21 may be rotatably coupled to the main body 10 by a left upper hinge 23 and a left lower hinge 24. The right door 22 may be rotatably coupled by a right upper hinge 25 and a right lower hinge (not shown).

On a rear surface of the doors 21 and 22, a door shelf 26 to store food and a gasket 27 that can be closely adhered to the front surface of the main body 10 so that the storage compartments 13 and 14 are sealed when the doors are closed may be provided. The door gasket 27 may include a magnet so as to be attached to the front surface of the main body 10 with a magnetic force. Front panels 31 and 32 may be coupled to front surfaces of the doors 21 and 22. The front panels 31 and 32 may be detachably coupled to the front surfaces of the doors 21 and 22.

A top table 2 may be provided on an upper surface of the main body 10. The top table 2 may cover at least a portion of the upper hinges 23 and 25 and prevent the upper hinges 23 and 25 from being exposed to the outside.

A door opening device 100 configured to open the doors 21 and 22 may be provided inside the top table 2. A door opening device receiver 3, in which the door opening device 100 is received, may be formed on a bottom surface of the top table 2, and the door opening device 100 may be received in the door opening device receiver 3. The door opening device 100 may be coupled to the bottom surface of the top table 2 to be received in the door opening device receiver 3. The door opening device 100 may be coupled to the bottom surface of the top table 2 through a fastening member 6. The top table 2 may be coupled to the upper surface of the main body 10 in a state in which the door opening device 100 is coupled to the top table 2.

Opening and closing sensors 141 and 142 configured to detect opening and closing of the doors 21 and 22 may be provided inside the top table 2. The opening and closing sensors 141 and 142 may include a Hall sensor configured to detect a change in magnetic field and generate a voltage. A magnet (not shown) detected by the opening and closing sensors 141 and 142 may be provided on the doors 21 and 22. However, the opening and closing sensors 141 and 142 are not limited thereto, and may include various types of sensors such as an optical sensor and a proximity sensor.

The door opening device 100 may open the doors 21 and 22 by pushing the rear surfaces of the doors 21 and 22 forward. The door opening device 100 may partially open the doors 21 and 22 to allow a user to open the doors 21 and 22 with little force. The door opening device 100 may include push rods 111 and 112 configured to move. The push rods 111 and 112 may include a first push rod 111 configured to open the first door 21 and a second push rod 112 configured to open the second door 22.

Rod holes 5 through which the first push rod 111 and the second push rod 112 penetrate may be formed in a front surface 4 of the top table 2.

A first handle 61 that is recessed may be formed on a side surface 43*a* of the first door 21 to allow a user to put his/her hand and to be gripped by the user. The first handle 61 may be recessed on the side surface 43*a* of the first door 21, but may be formed only in a part of a section between an upper end and a lower end of the first door 21 rather than in the entire section.

A second handle 261 that is recessed may be formed on a side surface 243*a* of the second door 22 to allow a user to put his/her hand and to be gripped by the user. The second handle 261 may be recessed on the side surface 243*a* of the second door 22, but may be formed only in a part of a section between an upper end and a lower end of the second door 22 rather than in the entire section.

Figure 12:
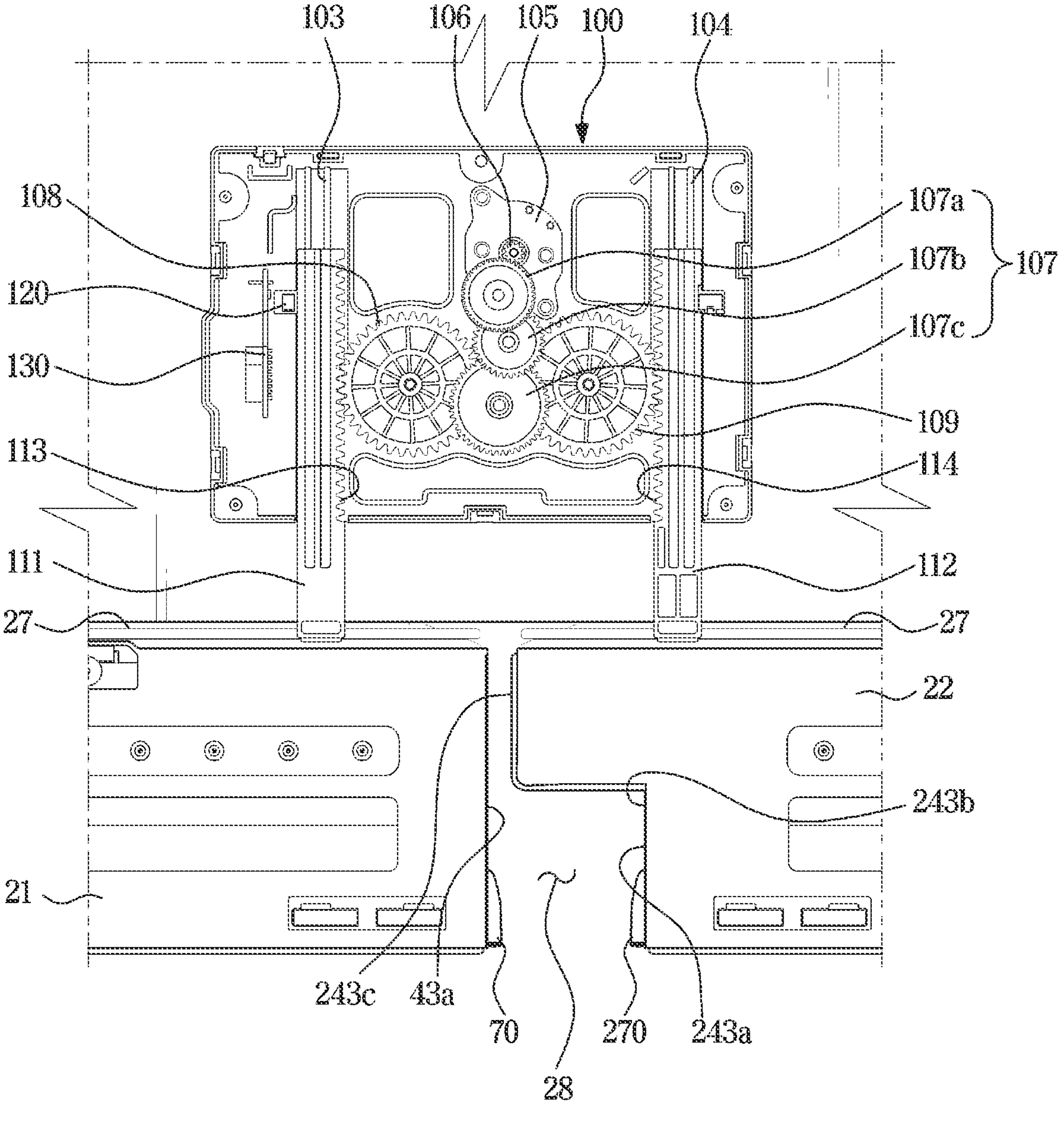
FIG. 12 is a view illustrating a state in which a first push rod of the door opening device is in a neutral position of the first push rod and a second push rod is in a neutral position of the second push rod according to an embodiment of the disclosure.

The side surface 243*a* of the second door 22 may be formed to have a step (refer to FIG. 12). That is, a distance between a front portion 243*b* of the side surface 243*a* of the second door 22 and the side surface 43*a* of the first door 21 may be greater than a distance between a rear portion 243*c* of the side surface 243*a* of the second door 22 and the side surface 43*a* of the first door 21. Therefore, between the front portion 243*b* of the side surface 243*a* of the second door 22 and the side surface 43*a* of the first door 21, a space 28 through which a user can put his/her hand to the first handle 61 and the second handle 261 may be formed. The second handle 261 may be formed on the front portion 243*b* of the side surface 243*a* of the second door 22.

The door opening device 100 may be operated through switches 70 and 270. A user can operate the door opening device 100 by manipulating the switches 70 and 270. According to an embodiment, the switches 70 and 270 may be operated by a user's touch.

The switches 70 and 270 may include a first switch 70 provided on the first door 21 and a second switch 270 provided on the second door 22. The first switch 70 may operate the door opening device 100 to allow the door opening device 100 to open the first door 21. The second switch 270 may operate the door opening device 100 to allow the door opening device 100 to open the second door 22.

That is, the first switch 70 may operate the door opening device 100 to allow the first push rod 111 to move forward and the second push rod 112 to move backward. The first push rod 111 may advance and press the first door 21 to open the first door 21. The second switch 270 may operate the door opening device 100 to allow the first push rod 111 to move backward and the second push rod 112 to move forward. The second push rod 112 may advance and press the second door 22 to open the second door 22.

The first switch 70 may be provided on the side surface 43*a* of the first door 21. The first switch 70 may be located in front of the first handle 61 on the side surface 43*a* of the first door 21. Accordingly, the first switch 70 may be touched at the same time as a user grabs the first handle 61 with his/her hand.

At least a portion of the first switch 70 may be provided to protrude from the side surface 43*a* of the first door 21. Due to this structure, a user can hold the first handle 61 more comfortably.

The second switch 270 may be provided on the side surface 243*a* of the second door 22. The second switch 270 may be located in front of the second handle 261 on the side surface 243*a* of the second door 22. Accordingly, the second switch 270 may be touched at the same time as a user grabs the second handle 261 with his/her hand.

At least a portion of the second switch 270 may be provided to protrude from the side surface 243*a* of the second door 22. Due to this structure, a user can hold the second handle 261 more comfortably.

According to an embodiment of the disclosure, heights of the first switch 70 and the second switch 270 may be different from each other. That is, the height of the first switch 70 and the height of the second switch 270 may differ by a predetermined height H.

Because the height of the first switch 70 and the height of the second switch 270 are different, it is possible to prevent one of the first switch 70 and the second switch 270 from being unintentionally touched, and it is possible to prevent the malfunction of the door opening device 100.

Figure 5:
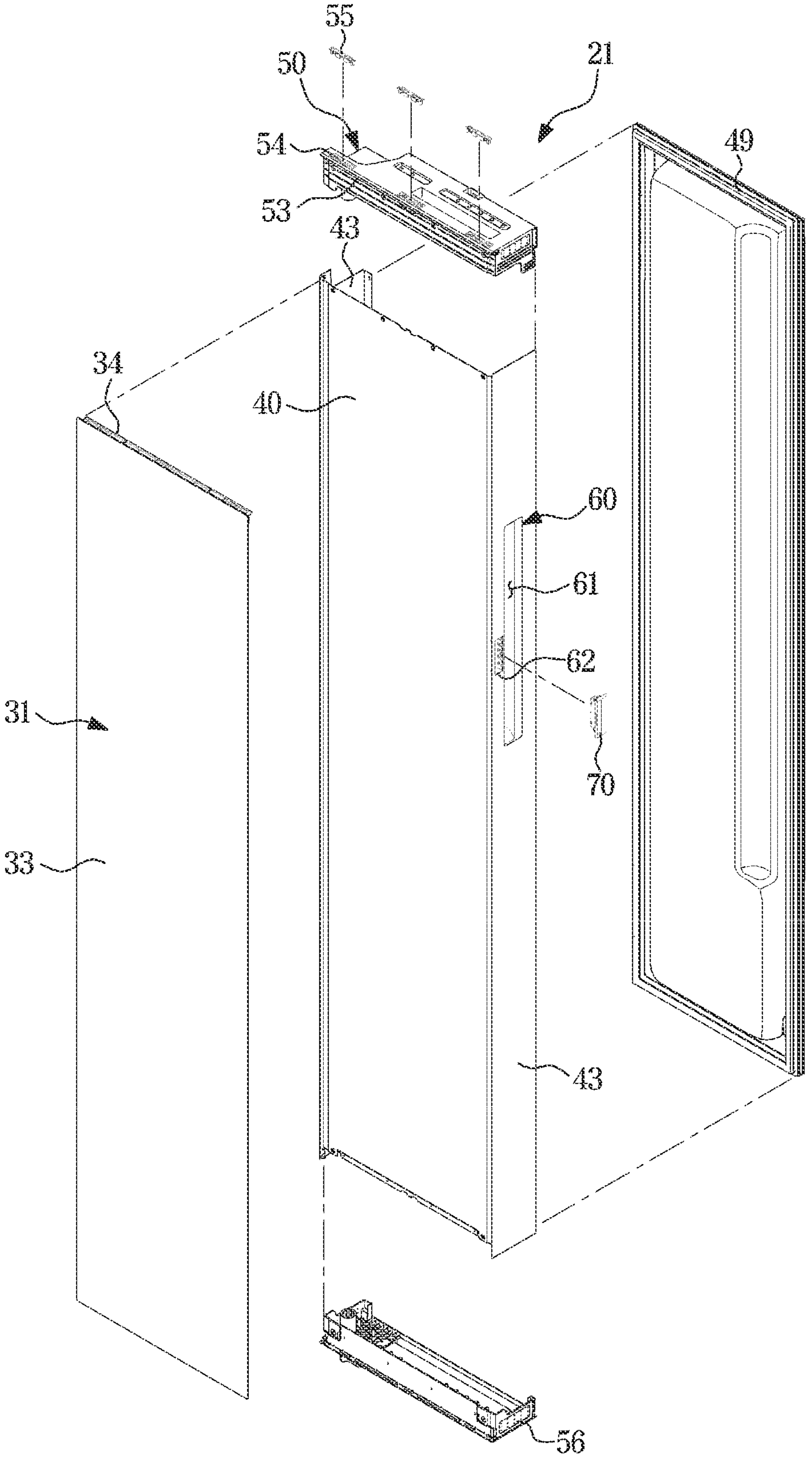
FIG. 5 is a view illustrating a state in which the door and a front panel are separated according to an embodiment of the disclosure.
Figure 6:
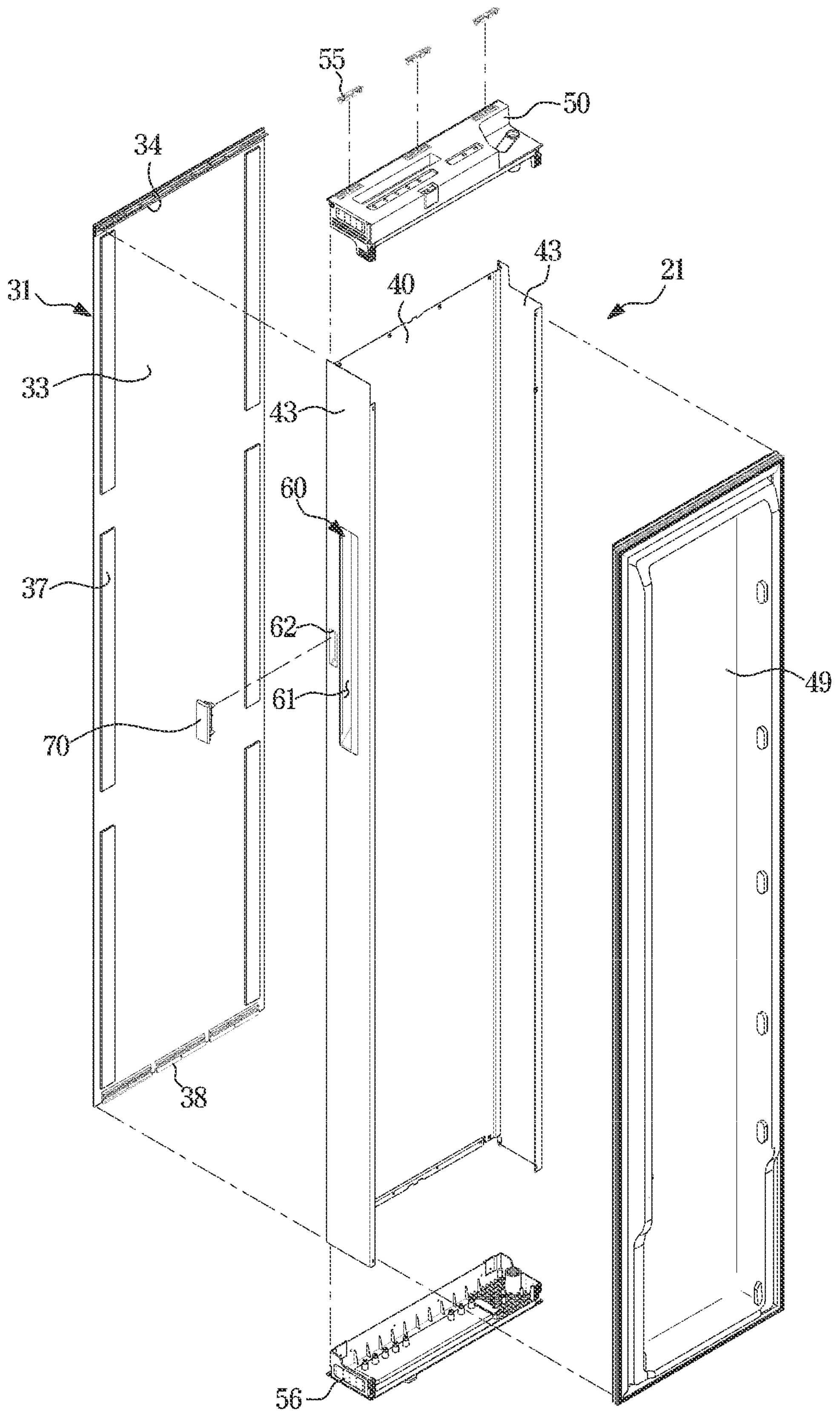
FIG. 6 is a view illustrating a state in which the door and the front panel are separated according to an embodiment of the disclosure when viewed from another angle.
Figure 7:
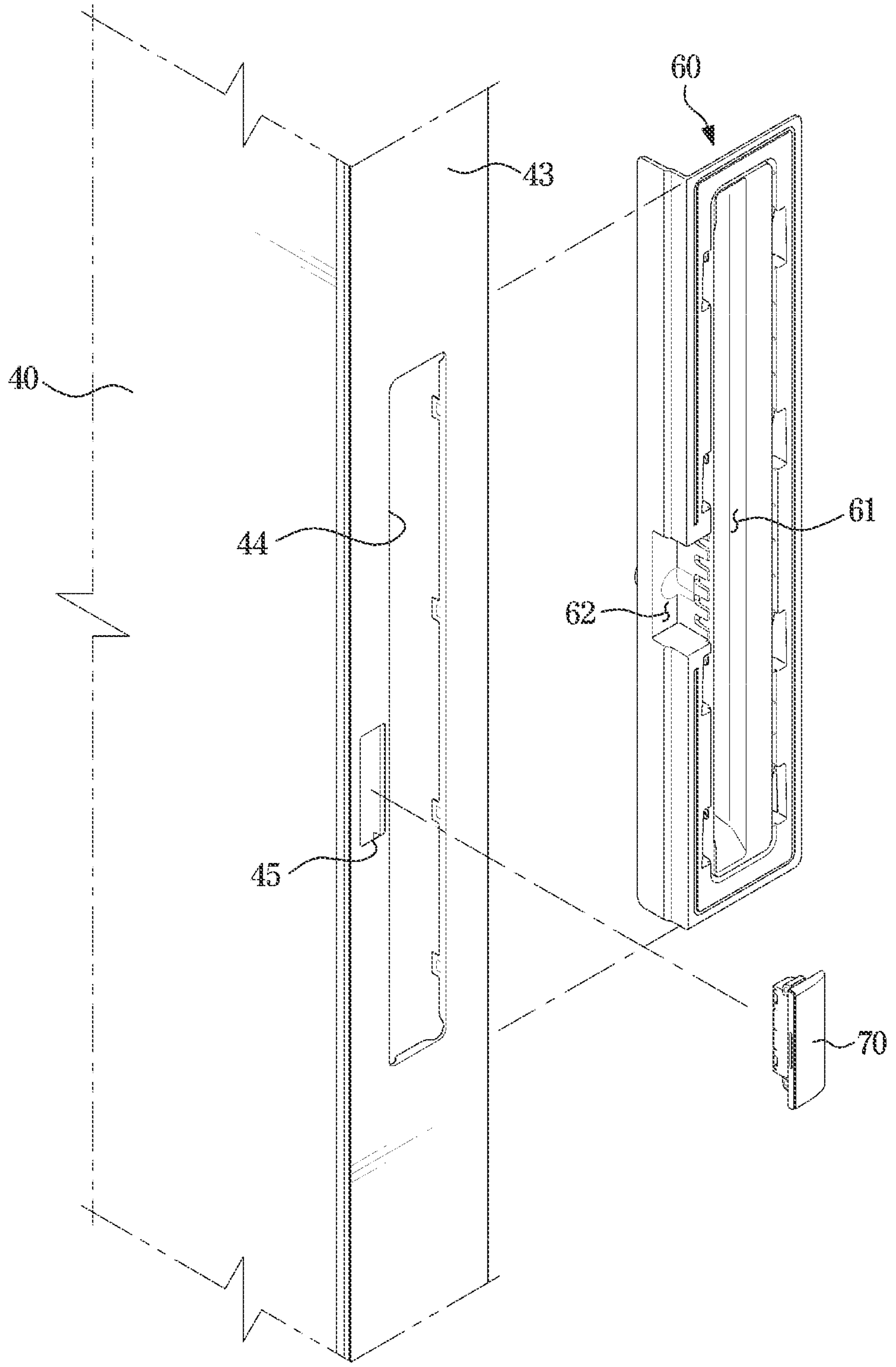
FIG. 7 is a view illustrating a side member and a side cap of the door according to an embodiment of the disclosure.

FIG. 5 is a view illustrating a state in which the door and a front panel are separated according to an embodiment of the disclosure. FIG. 6 is a view illustrating a state in which the door and the front panel are separated according to an embodiment of the disclosure when viewed from another angle. FIG. 7 is a view illustrating a side member and a side cap of the door according to an embodiment of the disclosure.

The doors 21 and 22 according to an embodiment of the disclosure will be described with reference to FIGS. 5 to 7. Because configurations of the first door 21 and the second door 22 are almost similar, the first door 21 will be described and a description of the second door 22 will be omitted below.

The door 21 may include a door front member 40 forming the front surface of the door 21, a door side member 43 forming the side surface of the door 21, and a door rear member 49 forming the rear surface of the door 21.

According to an embodiment, the door front member 40 and the door side member 43 may be integrally formed with each other. For example, the door front member 40 and the door side member 43 may be formed by bending a single metal plate.

According to an embodiment, the door front member 40 and the door side member 43 may be formed separately from each other. The door front member 40 and the door side member 43 may be coupled to each other.

A handle opening 44 and a switch opening 45 may be formed in the door side member 43. According to an embodiment, the handle opening 44 and the switch opening 45 may be formed separately and spaced apart from each other. The handle opening 44 may be formed larger than the switch opening 45. However, the size of the handle opening 44 and the switch opening 45 is not limited thereto. The handle opening 44 may be formed behind the switch opening 45.

According to an embodiment, the handle opening 44 and the switch opening 45 may be formed to be connected to each other.

The door 21 may include a side cap 60 coupled to an inner surface of the door side member 43. The side cap 60 may be coupled to the door side member 43 to cover the handle opening 44 and the switch opening 45. Because the side cap 60 is coupled to the inner surface of the door side member 43, the foaming solution may not leak through the handle opening 44 and the switch opening 45 when the insulating material is foamed in the inner space of the door 21.

The side cap 60 may be injection molded of a plastic material. Because the side cap 60 is injection molded from a plastic material, various shapes may be easily formed on the side cap 60. For example, the handle 61 may be recessed in the side cap 60. In addition, a switch mounting space 62 in which the switch 70 is mounted may be formed in the side cap 60.

The handle 61 may be formed in a size and shape substantially corresponding to the handle opening 44. The handle 61 may be accessible through the handle opening 44. The switch mounting space 62 may be formed to have a size and shape substantially corresponding to the switch opening 45.

The door rear member 49 may be coupled to the door side member 43. The door gasket 27 (refer to FIG. 2) may be provided at an edge portion of the door rear member 49. The door rear member 49 may include a dyke protruding backward, and the door shelf 26 (refer to FIG. 2) may be mounted on the dyke.

The door 21 may include an upper cap 50 and a lower cap 56. The door front member 40, the both door side members 43, the door rear member 49, the upper cap 50, and the lower cap 56 may be coupled to form an inner space. A door insulating material may be provided in the inner space.

The upper cap 50 and the lower cap 56 may be injection molded from a plastic material. A structure for detachably coupling the front panel 31 to the front surface of the door 21 may be formed on the upper cap 50 and the lower cap 56.

The switch 70 may be mounted in the switch mounting space 62 formed in the side cap 60. The switch 70 may be inserted into the switch mounting space 62 through the switch opening 45 formed in the door side member 43.

The switch 70 may receive a user input for operating the door opening device 100. The switch 70 may receive a user input by a user's touch. That is, when a user touches the switch 70, the switch 70 may generate a signal to operate the door opening device 100.

The switch 70 may include a touch switch configured to generate a door open signal according to capacitance change. However, the switch 70 may include switches of various other types other than a method of detecting a change in capacitance according to a touch. According to an embodiment, the switch 70 may include a mechanical push switch such as a button type, a dial type, or a toggle type. The switch may include a non-contact switch. That is, the switch may include a reed switch operated by a magnet, a proximity sensor switch including a proximity sensor, and a time of flight (TOF) switch including a TOF sensor using an infrared wavelength.

According to an embodiment, the refrigerator 1 may include the front panels 31 and 32 detachably coupled to front surfaces of the doors 21 and 22. The front panel 31 and the front panel 32 include the same or most similar configurations, and thus only the front panel 31 will be described.

The front panel 31 may be detachably coupled to the front surface of the door 21. The front panel 31 may include a panel body 33, an upper trim 34 provided on an upper side of the rear surface of the panel body 33, and a lower trim 38 provided on a lower side of the rear surface of the panel body 33. The upper trim 34 may be elongated along an upper edge of the panel body 33. The lower trim 38 may be elongated along a lower edge of the panel body 33.

The upper trim 34 and the lower trim 38 may be provided separately from the panel body 33, and attached to the panel body 33 through an adhesive. Alternatively, the upper trim 34 and the lower trim 38 may be integrally formed with the panel body 33.

When the front panel 31 is coupled to the door 21, the lower trim 38 may be supported by the lower cap 56. When the front panel 31 is coupled to the door 21, the upper trim 34 may be coupled to the upper cap 50 through a fixer 55. When the front panel 31 is coupled to the door 21, the upper trim 34 may be inserted into the upper cap 50 through a trim opening 53 of the upper cap 50. When the front panel 31 is coupled to the door 21, the fixer 55 may be coupled to the upper trim 34 through a fixer opening 54 formed on the upper side of the upper cap 50. With this configuration, the front panel 31 may be detachably coupled to the door 21.

The front panel 31 may include a magnet 37 for coupling with the door 21. The magnet 37 may be provided to extend vertically on left and right edges of the panel body 33. With magnetic force, the magnet 37 may be in close contact with the door front member 40 formed of a metal.

Figure 8:
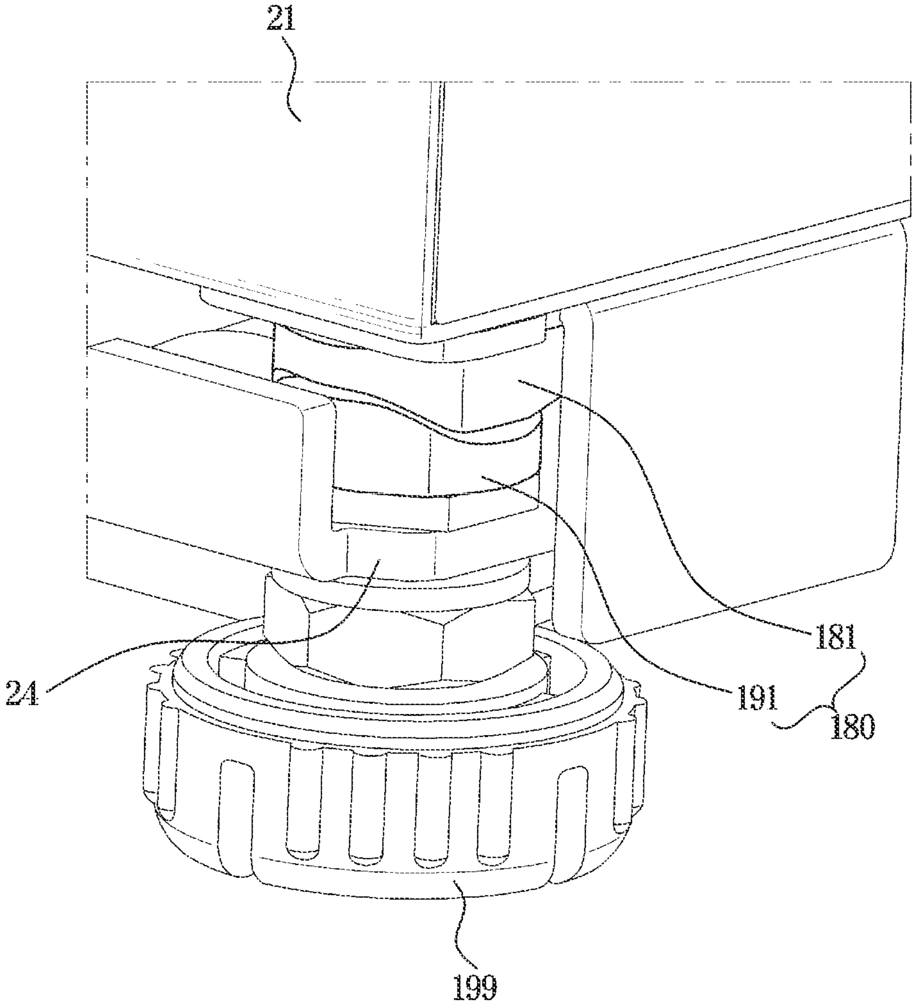
FIG. 8 is a view illustrating a vicinity of a lower hinge of the refrigerator according to an embodiment of the disclosure.
Figure 9:
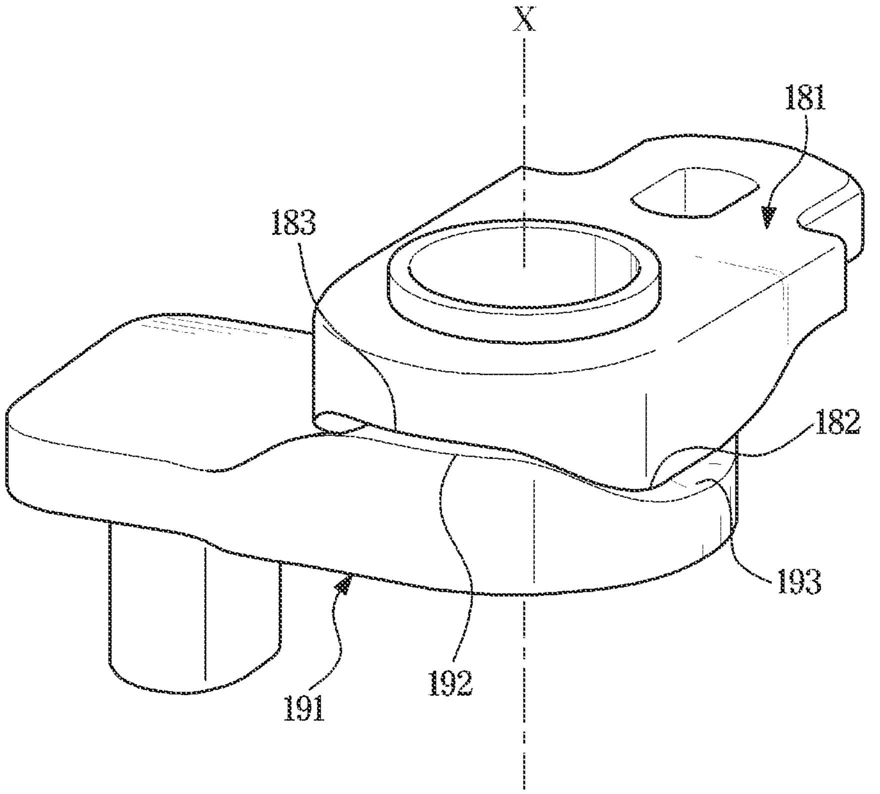
FIG. 9 is a view illustrating a cam unit according to an embodiment of the disclosure, particularly, a view illustrating the cam unit in a state in which the door is closed.
Figure 10:
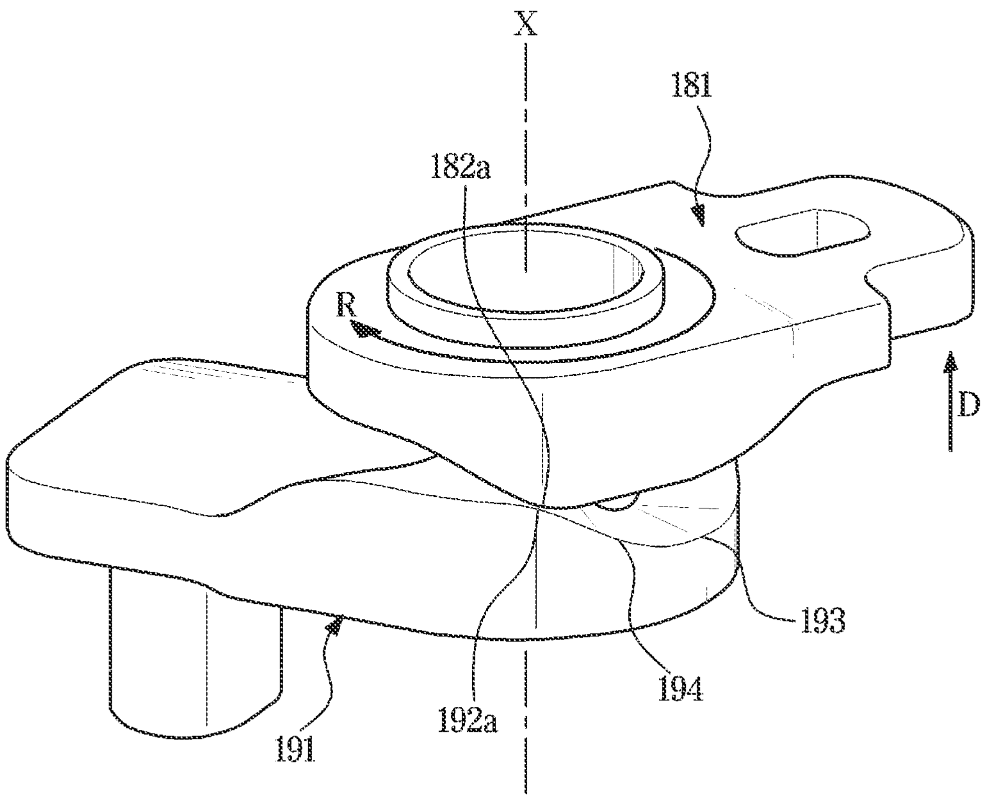
FIG. 10 is a view illustrating the cam unit according to an embodiment of the disclosure, particularly, a view illustrating the cam unit in a state in which the door is opened (particularly, a state in which a push rod is at a maximum forward position of the push rod)

FIG. 8 is a view illustrating a vicinity of a lower hinge of the refrigerator according to an embodiment of the disclosure. FIG. 9 is a view illustrating a cam unit according to an embodiment of the disclosure, particularly, a view illustrating the cam unit in a state in which the door is closed. FIG. 10 is a view illustrating the cam unit according to an embodiment of the disclosure, particularly, a view illustrating the cam unit in a state in which the door is opened (particularly, a state in which a push rod is at a maximum forward position of the push rod).

The cam unit according to an embodiment of the disclosure will be described with reference to FIGS. 8 to 10.

According to an embodiment, the refrigerator 1 includes the cam unit 180 configured to automatically close the doors 21 and 22. Because the cam unit 180 is applicable to both the first door 21 and the second door 22, only the cam unit 180 of the first door 21 will be described and a description of the cam unit 180 of the second door 22 will be omitted.

The cam unit 180 may allow the door 21 to be closed by itself when no external force is applied in a state in which the door 21 is opened at a predetermined opening angle or less. The cam unit 180 may allow the door 21 to be closed by itself due to a weight of the door 21.

The cam unit 180 may include a door cam 181 provided in a lower portion of the door 21 and a hinge cam 191 provided on the lower hinge 24. The door cam 181 may be fixed to the lower portion of the door 21, and the hinge cam 191 may be fixed to the lower hinge 24. When the door 21 is rotated, the door cam 181 may also be rotated above the hinge cam 191. A leg 199 supporting a load of the main body 10 may be provided below the lower hinge 24.

On an upper surface of the hinge cam 191, a hinge cam peak 192 and a hinge cam valley 193 may be alternately formed along a circumferential direction around a rotation axis X of the door 21. On a lower surface of the door cam 181, a door cam valley 183 and a door cam peak 182 may be alternately formed to correspond to the hinge cam peak 192 and the hinge cam valley 193.

When the door 21 is in a closed state, the door cam peak 182 may be engaged with the hinge cam valley 193, and the door cam valley 183 may be engaged with the hinge cam peak 192 (refer to FIG. 9).

When the door 21 is rotated in an opening direction R around the rotation axis X, the door cam 181 may also be rotated together. As the door cam 181 is rotated, the door cam 181 may ascend along an inclined surface 194 between the hinge cam valley 193 and the hinge cam peak 192.

When an external force applied to the door 21 disappears in a state in which a lowest part **182*a* of the door cam peak does not reach a highest part 192*a* of the hinge cam peak, the door 21 may be forced downward by its own weight. Accordingly, the door 21 may be closed by rotating in the opposite direction to the opening direction R along the inclined surface 194 between the hinge cam peak 192 and the hinge cam valley 193**.

Figure 11:
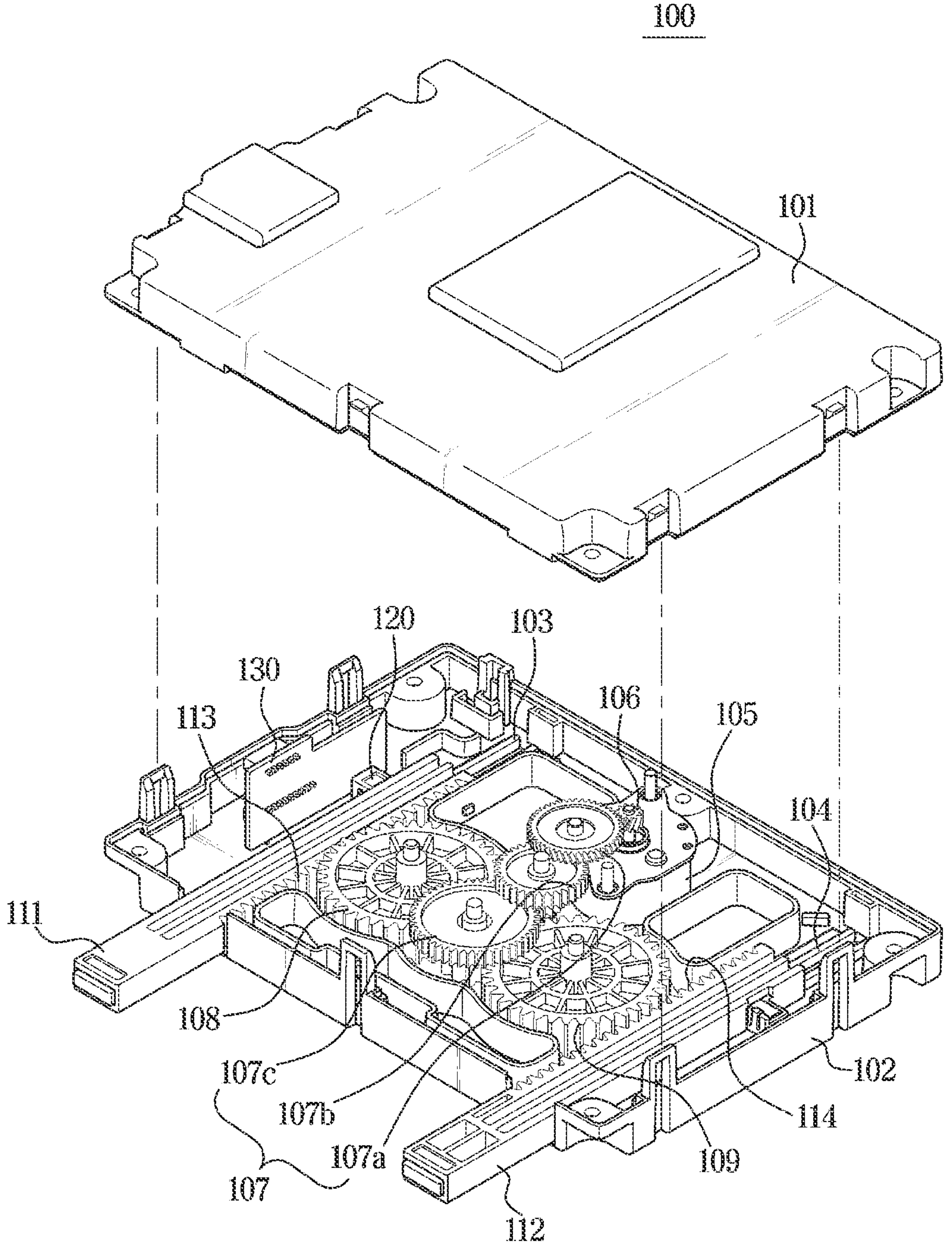
FIG. 11 is an exploded view illustrating the door opening device according to an embodiment of the disclosure.
Figure 13:
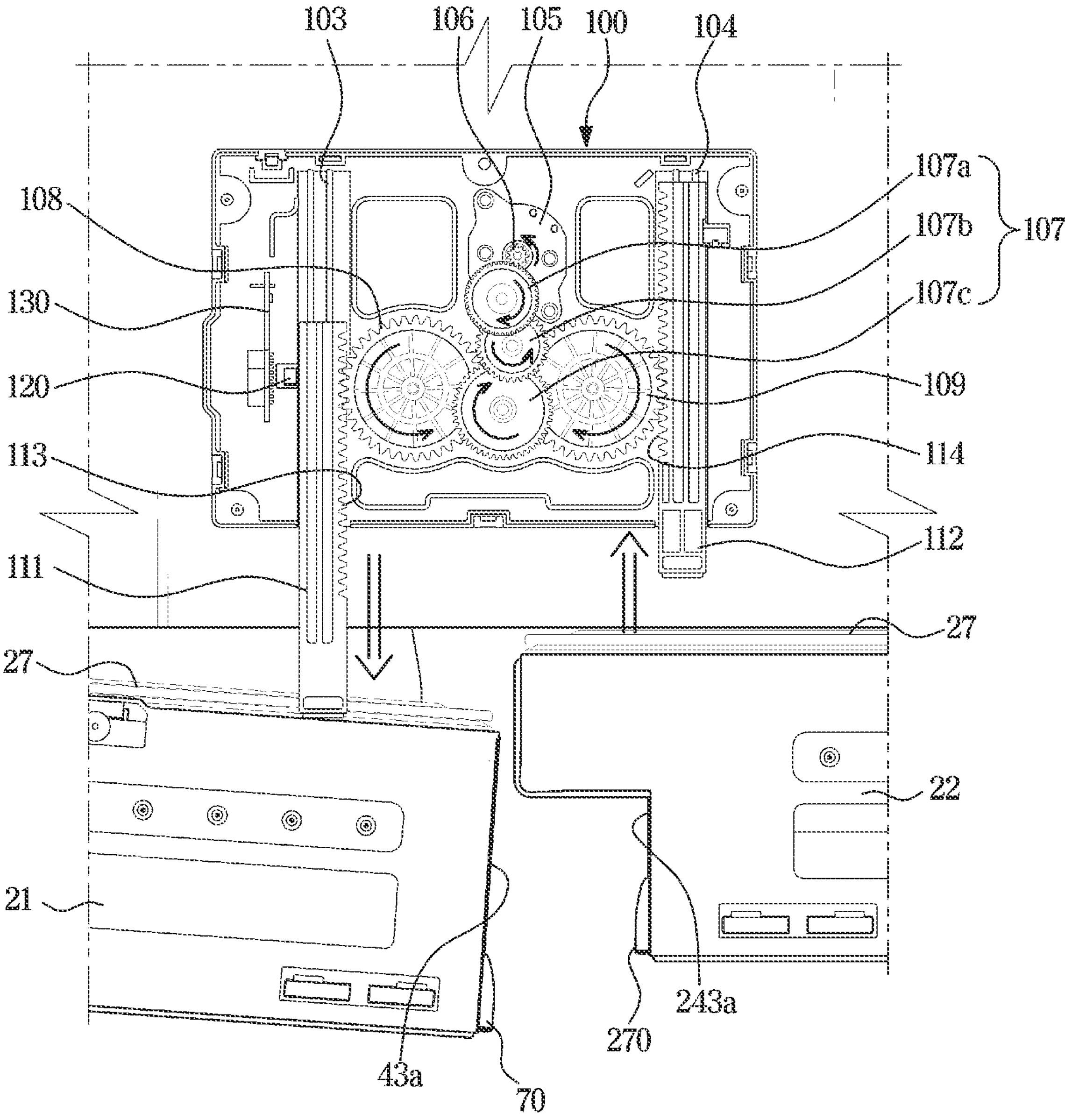
FIG. 13 is a view illustrating a state in which the first push rod of the door opening device is at the maximum forward position and the second push rod of the door opening device is at a maximum backward position according to an embodiment of the disclosure.
Figure 14:
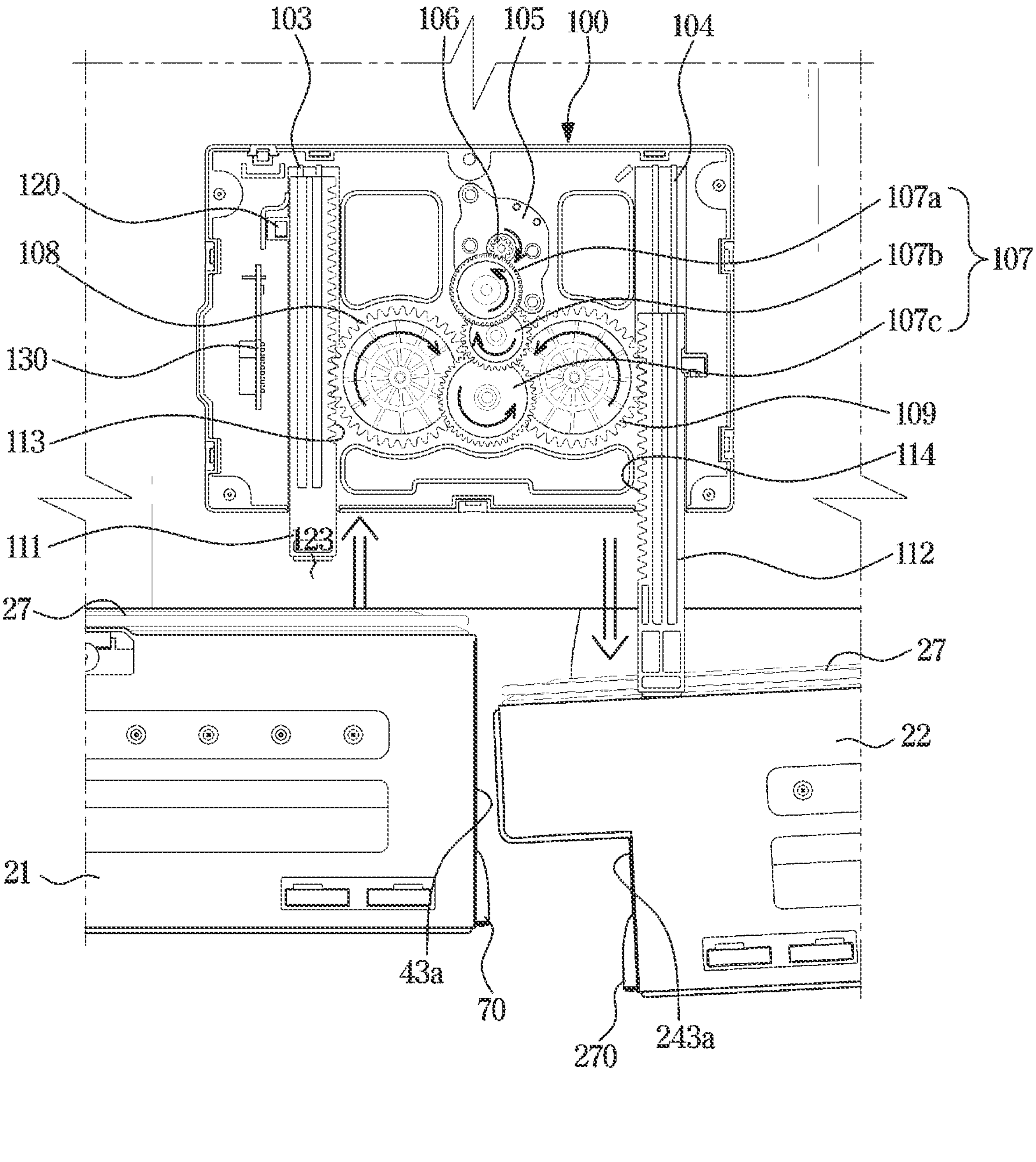
FIG. 14 is a view illustrating a state in which the first push rod of the door opening device is at a maximum backward position and the second push rod of the door opening device is at a maximum forward position according to an embodiment of the disclosure.

FIG. 11 is an exploded view illustrating the door opening device according to an embodiment of the disclosure. FIG. 12 is a view illustrating a state in which a first push rod of the door opening device is in a neutral position of the first push rod and a second push rod is in a neutral position of the second push rod according to an embodiment of the disclosure. FIG. 13 is a view illustrating a state in which the first push rod of the door opening device is at the maximum forward position and the second push rod of the door opening device is at a maximum backward position according to an embodiment of the disclosure. FIG. 14 is a view illustrating a state in which the first push rod of the door opening device is at a maximum backward position and the second push rod of the door opening device is at a maximum forward position according to an embodiment of the disclosure.

Referring to FIGS. 11 to 14, according to an embodiment of the disclosure, the door opening device 100 may include cases 101 and 102, a motor 105 provided inside the cases 101 and 102, the pair of push rods 111 and 112 configured to move forward and backward by the driving force generated in the motor 105, and a transmission gear assembly 107 configured to transmit the driving force of the motor 105 to the pair of push rods 111 and 112.

The cases 101 and 102 may include an upper case 101 and a lower case 102 coupled to a lower portion of the upper case 101. The motor 105 and the transmission gear assembly 107 may be received inside the cases 101 and 102. A portion of the push rods 111 and 112 may pass through the cases 101 and 102 and protrude out of the cases 101 and 102.

The pair of push rods 111 and 112 may be configured to move forward and backward, respectively. The pair of push rods 111 and 112 may be configured to move in opposite directions at the same time. The pair of push rods 111 and 112 may be configured to move at the same speed in opposite directions.

A pair of movement guides 103 and 104 provided to guide movement of the pair of push rods 111 and 112 may be arranged inside the cases 101 and 102. The pair of push rods 111 and 112 may be movably coupled to the pair of movement guides 103 and 104, respectively, and may move forward and backward along with the movement guides 103 and 104. The pair of movement guides 103 and 104 may be arranged parallel to each other.

The motor 105 may be a motor capable of forward and reverse driving. The motor 105 may include a DC stepper motor. A motor gear 106 may be provided on a motor shaft of the motor 105 to rotate together with the motor shaft. A rotational force of the motor gear 106 may be transmitted to a pair of pinion gears 108 and 109 through the transmission gear assembly 107.

Rack gears 113 and 114 engaged with the pinion gears 108 and 109 may be provided on the push rods 111 and 112. A rotational motion of the pinion gears 108 and 109 may be converted into a linear motion of the rack gears 113 and 114.

A first rack gear 113 may be engaged with the first pinion gear 108 to allow the first push rod 111 to move forward when the first pinion gear 108 rotates counterclockwise, and to allow the first push rod 111 to move backward when the first pinion gear 108 rotates clockwise.

A second rack gear 114 may be engaged with the second pinion gear 109 to allow the second push rod 112 to move backward when the second pinion gear 109 rotates counterclockwise, and to allow the second push rod 112 to move forward when the second pinion gear 109 rotates clockwise.

The transmission gear assembly 107 may include at least one transmission gear 107*a*, 107*b*, and 107*c*. The number of transmission gears included in the transmission gear assembly 107 is not limited thereto. The transmission gears 107*a*, 107*b*, and 107*c* may have the form of two-stage spur gear to reduce the rotational force of the motor 105 and transmit the reduced rotation force to the pair of pinion gears 108 and 109. That is, the transmission gears 107*a*, 107*b*, and 107*c* may include an upper spur gear and a lower spur gear having a radius smaller than that of the upper spur gear.

The motor gear 106 may be engaged with an upper spur gear of the first transmission gear 107*a*. A lower spur gear of the first transmission gear 107*a* may be engaged with an upper spur gear of the second transmission gear 107*b*. A lower spur gear of the transmission gear 107*b* may be engaged with an upper spur gear of the third transmission gear 107*c*. A lower spur gear of the third transmission gear 107*c* may be engaged with the first pinion gear 108 and the second pinion gear 109. The first pinion gear 108 and the second pinion gear 109 may be engaged with the left and right sides of the third transmission gear 107*c*, respectively. Therefore, when the third transmission gear 107*c* rotates, the first pinion gear 108 and the second pinion gear 109 may rotate in different directions.

The door opening device 100 may include a position detection sensor 130 configured to detect a position of the push rods 111 and 112. The position detection sensor 130 may include a Hall sensor configured to sense a change in a magnetic field and generate a voltage. A magnet 120 provided to be detected by the position detection sensor 130 may be provided in one of the plurality of push rods 111 and 112.

However, the position detection sensor 130 is not limited thereto, and may include various types of sensors such as an optical sensor and a proximity sensor.

As described above, the first push rod 111 and the second push rod 112 may move at the same speed in opposite directions, and thus when a position of one of the first push rod 111 and the second push rod 112 is detected, a position of the other of the first push rod 111 and the second push rod 112 may be detected. Accordingly, it may be sufficient that the position detection sensor 130 and the magnet 120 are configured to detect the position of one of the plurality of push rods 111 and 112.

The door opening device 100 may open the first door 21 or the second door 22 according to the driving direction of the motor 105 (i.e., the rotation direction of the motor shaft). For example, when the motor 105 rotates in a forward direction (e.g., counterclockwise when viewed from above), the first push rod 111 of the door opening device 100 may move forward to open the first door 21. When the motor 105 rotates in a reverse direction (e.g., clockwise when viewed from above), the second push rod 112 of the door opening device 100 may move forward to open the second door 22.

The driving direction of the motor 105 may be determined according to manipulation of the switches 70 and 270. For example, when the first switch 70 is operated, the motor 105 may be driven in the forward direction to allow the first door 21 to be opened. When the second switch 270 is operated, the motor 105 may be driven in the reverse direction to allow the second door 22 to be opened.

The first push rod 111 and the second push rod 112 may initially be in a neutral position (refer to FIG. 12).

When the motor 105 is driven in the forward direction in a state in which the first push rod 111 and the second push rod 112 are in the neutral position, the first push rod 111 may move forward and the second push rod 112 may move backward. The first push rod 111 may push the first door 21 while moving forward, so as to open the first door 21.

The first push rod 111 may move forward to the maximum forward position of the first push rod and the second push rod 112 may move backward to the maximum backward position of the second push rod (refer to FIG. 13). When the first push rod 111 is at the maximum forward position of the first push rod, the second push rod 112 may be at the maximum backward position of the second push rod.

An opening angle of the door 21 when the first push rod 111 is at the maximum forward position of the first push rod may be an angle in which the lowest part 182*a* of the door cam peak does not reach the highest part 192*a* of the hinge cam peak (refer to FIG. 10). Accordingly, in this state, when the first push rod 111 moves backward, the door 21 may be closed by itself by the cam unit 180.

When the motor 105 is driven in the reverse direction in a state in which the first push rod 111 is at the maximum forward position of the first push rod and the second push rod 112 is at the maximum backward position of the second push rod 112, the first push rod 111 may move backward and the second push rod 112 may move forward.

The first push rod 111 may move backward and the second push rod 112 may move forward. Accordingly, the first push rod 111 and the second push rod 112 may return to the neutral positions thereof.

When the motor 105 is driven in the reverse direction in a state in which the first push rod 111 and the second push rod 112 are in the neutral position, the first push rod 111 may move backward and the second push rod 112 may move forward. The second push rod 112 may push the second door 22 while moving forward, so as to open the second door 22.

The first push rod 111 may move backward to the maximum backward position of the first push rod, and the second push rod 112 may move forward to the maximum forward position of the second push rod (refer to FIG. 14). When the first push rod 111 is at the maximum backward position of the first push rod, the second push rod 112 may be at the maximum forward position of the second push rod.

Figure 15:
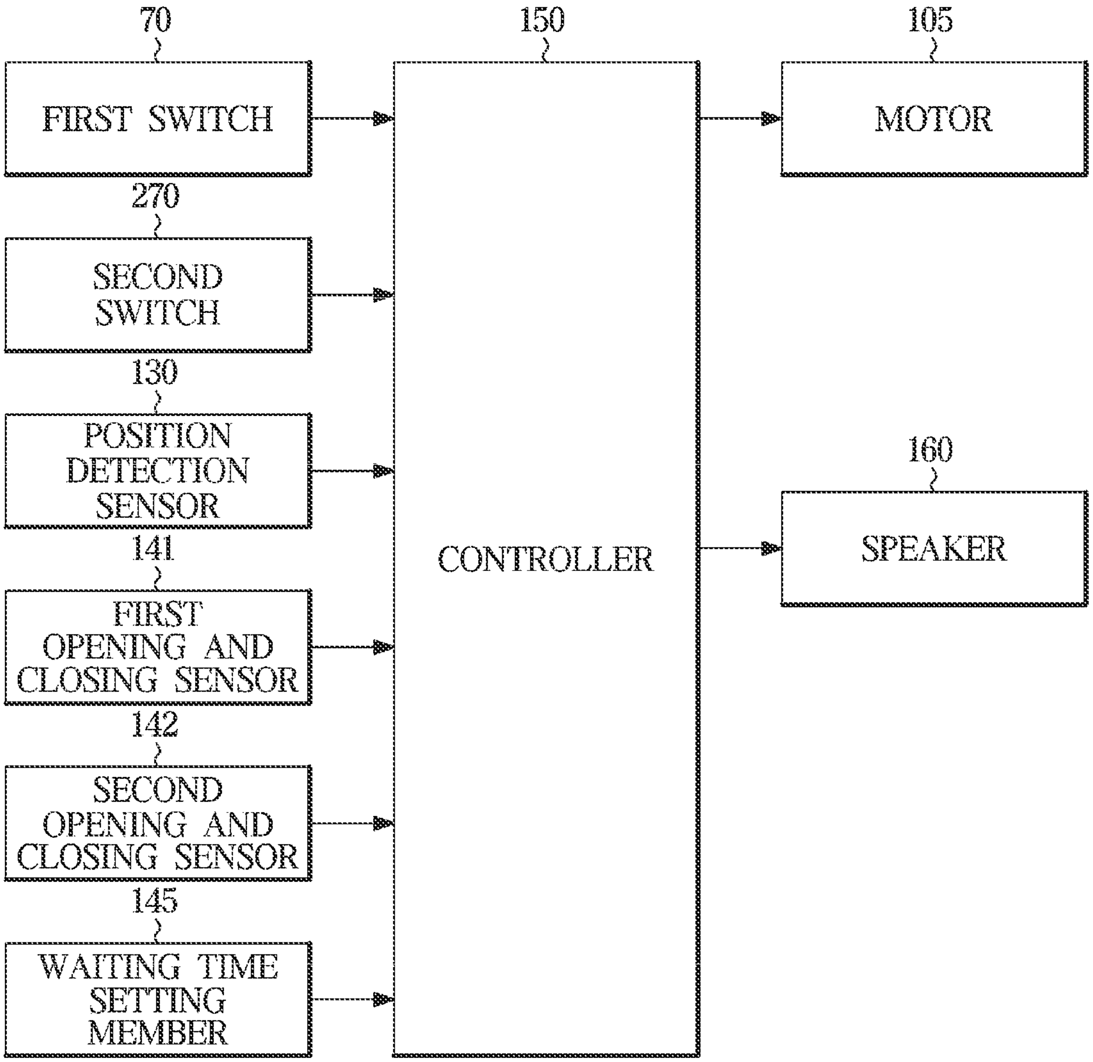
FIG. 15 is a control block diagram of the refrigerator according to an embodiment of the disclosure.
Figure 16:
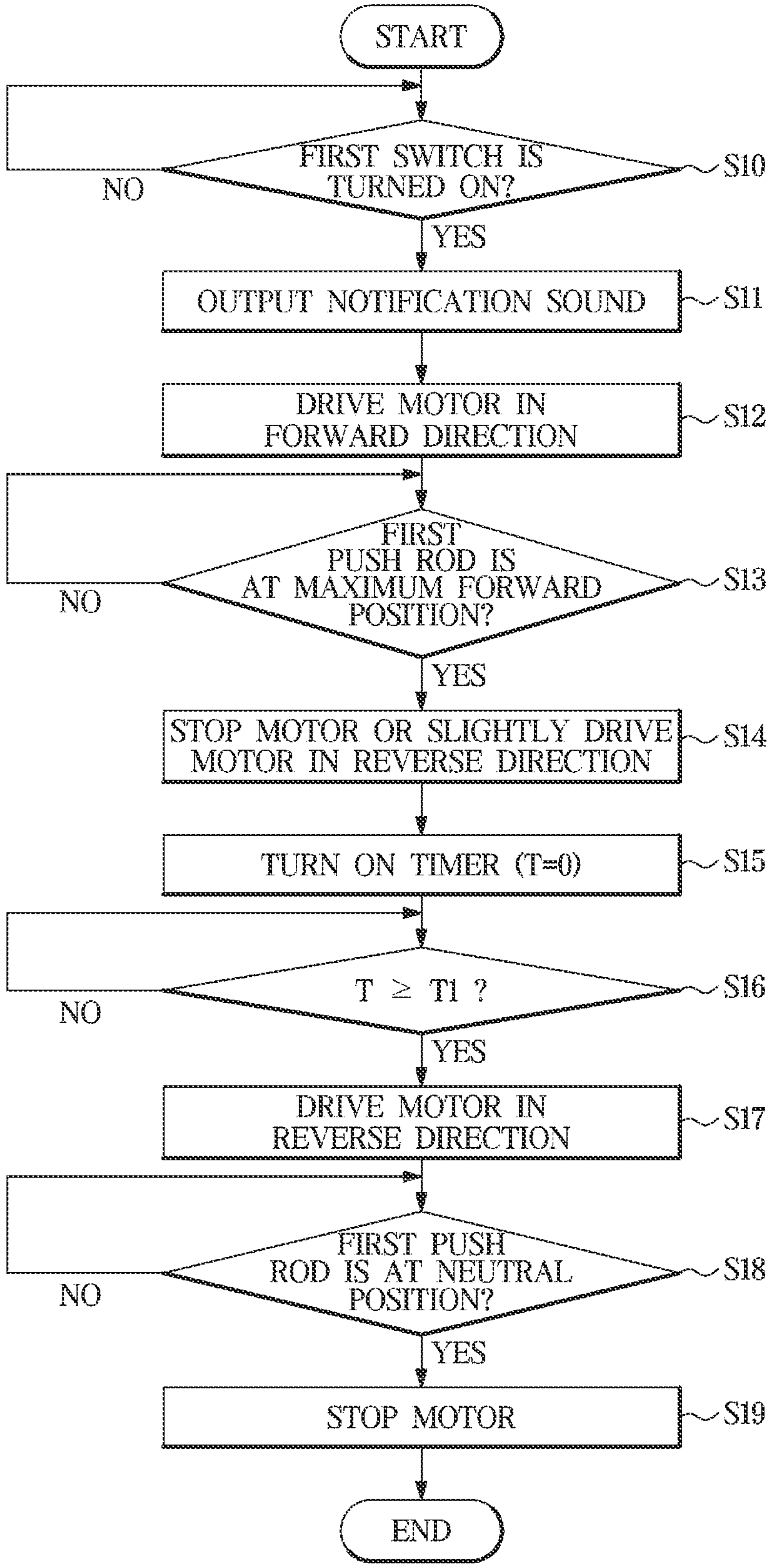
FIG. 16 is a control flowchart of the refrigerator according to an embodiment of the disclosure, particularly a control flowchart in a state in which a second switch is not turned on in opening of the first door, waiting of the first door and closing of the first door.

FIG. 15 is a control block diagram of the refrigerator according to an embodiment of the disclosure. FIG. 16 is a control flowchart of the refrigerator according to an embodiment of the disclosure, particularly a control flowchart in a state in which a second switch is not turned on in opening of the first door, waiting of the first door and closing of the first door.

A control method of the refrigerator according to an embodiment of the disclosure will be described with reference to FIGS. 15 and 16.

Hereinafter a case in which the first switch 70 is turned on (i.e., when a user input is received) in a state where the first push rod 111 and the second push rod 112 are each in the neutral position will be described. Even when the second switch 270 is turned on in a state in which the first push rod 111 and the second push rod 112 are in the neutral position, it may be controlled correspondingly.

According to an embodiment, the refrigerator 1 may include a controller 150 configured to control the motor 105 and a speaker 160 according to a user input received by the switches 70 and 270, and the positional information of the push rods 111 and 112 detected by the position detection sensor 130.

In response to the first switch 70 being turned on in a state where the first push rod 111 and the second push rod 112 are in the neutral position, the controller 150 may output a notification sound through the speaker 160 (11). As the notification sound is output through the speaker 160, a user can recognize that the door opening device 100 starts to operate.

In response to receiving a user input from the first switch 70, the controller 150 may drive the motor 105 in the forward direction until the first push rod 111 reaches the forward position of the first push rod 111 from the neutral position of the first push rod (12 and 13). As the motor 105 is driven in the forward direction, the first push rod 111 may move forward and the second push rod 112 may move backward. The first door 21 may be opened as the first push rod 111 moves forward to push the first door 21.

The controller 150 may determine whether the first push rod 111 reaches the maximum forward position through the position detection sensor 130 (13).

The controller 150 may determine whether the first push rod 111 reaches the maximum forward position and perform at least one of stopping the motor 105 or slightly moving the motor 105 in the reverse direction before a predetermined waiting time elapses from when the first push rod 111 reaches the maximum forward position of the first push rod (14 to 16). The slight movement of the motor 105 in the reverse direction may include driving the motor 105 at low speed (a first reference driving speed) in the reverse direction.

As described above, the opening angle of the first door 21 when the first push rod 111 is at the maximum forward position of the first push rod may be an angle in which the lowest part 182*a* of the door cam peak does not reach the highest part 192*a* of the hinge cam peak (refer to FIG. 10).

In response to the confirmation that the first push rod 111 reaches the maximum forward position by determining whether the first push rod 111 reaches the maximum forward position, the controller 150 may turn on a timer to set an elapsed time T as '0 (zero)' (15).

The controller 150 checks whether the elapsed time T of the timer is greater than or equal to a waiting time (16). The waiting time may be preset as a first reference waiting time T1.

In steps 14 to 16, the controller 150 may stop the motor 105 throughout the waiting time from when the first push rod 111 reaches the maximum forward position of the first push rod 111. In addition, the controller 150 may drive the motor 105 in the reverse direction at the first reference driving speed throughout the waiting time from when the first push rod 111 reaches the maximum forward position of the first push rod 111.

Alternatively, the controller 150 may stop the motor 105 for a part of the waiting time and move the motor 105 in the reverse direction at the first reference driving speed for the remaining part of the waiting time. For example, the controller 150 may stop the motor 105 for a second reference waiting time T2, which will be described later, from when the first push rod 111 reaches the maximum forward position of the first push rod 111, and after the second reference waiting time T2 elapses, the controller 150 may drive the motor 105 in the reverse direction at the first reference driving speed for a third reference waiting time corresponding to a difference between the first reference waiting time T1 and the second reference waiting time T2. For example, the first reference waiting time T1 may be 1 second, and the second reference waiting time T2 and the third reference waiting time may be 0.5 second, respectively.

However, the first reference waiting time T1 may be set by a user. In addition, the second reference waiting time T2 may also be set by a user within a range shorter than the first reference waiting time T1. For this, the refrigerator 1 may include a waiting time setting member 145 configured to allow a user to set the first reference waiting time T1 and/or the second reference waiting time T2.

As mentioned above, in steps 14 to 16, the motor 105 may stop or slightly move in the reverse direction, and thus the first push rod 111 may stop or move backward slowly. Accordingly, it is possible to secure a time for a user to pull the first door 21 by holding the handle 61. In addition, when a user does not pull the first door 21, the first door 21 may be closed smoothly, and noise and energy consumption due to a sudden change in direction of the motor 105 may be reduced.

In response to the confirmation that the elapsed time T of the timer is greater than or equal to the first reference waiting time T1, the controller 150 drives the motor 105 in the reverse direction (17). That is, the controller 150 may drive the motor 105 in the reverse direction at the second reference driving speed until the first push rod 111 returns to the neutral position of the first push rod 111 after the waiting time elapses from when the first push rod 111 reaches the maximum forward position of the first push rod 111. The second reference driving speed may be greater than the first reference driving speed. For example, the first reference driving speed may be 10% or less of the maximum speed of the motor 105, and the second reference driving speed may be about 60% of the maximum speed of the motor 105. When the motor 105 is driven in the reverse direction, the first push rod 111 may move backward, and thus the first door 21 may be closed by itself by the cam unit 180. In this way, when a user does not pull the first door 21 for a predetermined waiting time, the first door 21 may be closed again by itself. Thus, it is possible to prevent the leakage of the cold air in the storage compartment.

The controller 150 may detect the position of the first push rod 111 through the position detection sensor 130 to determine whether the first push rod 111 returns to the neutral position (18).

In response to the confirmation that the first push rod 111 reaches the neutral position, the controller 150 may stop the motor 105 (19).

As mentioned above, according to an embodiment, the control method of the refrigerator 1 may include opening the first door (12 and 13), waiting the first door (14 to 16), and closing the first door (17 and 18).

In the opening of the first door (12 and 13), the motor 105 may be driven in the forward direction until the first push rod 110 reaches the maximum forward position, so as to open the first door 21.

In the waiting of the first door (14 to 16), it is possible to wait for a user to pull the first door 21 until the waiting time, which is preset as the first reference waiting time T1, elapses.

In the closing of the first door (17 and 18), the motor 105 may be driven in the reverse direction until the first push rod 110 returns to the neutral position, so as to close the first door 21.

Figure 17:
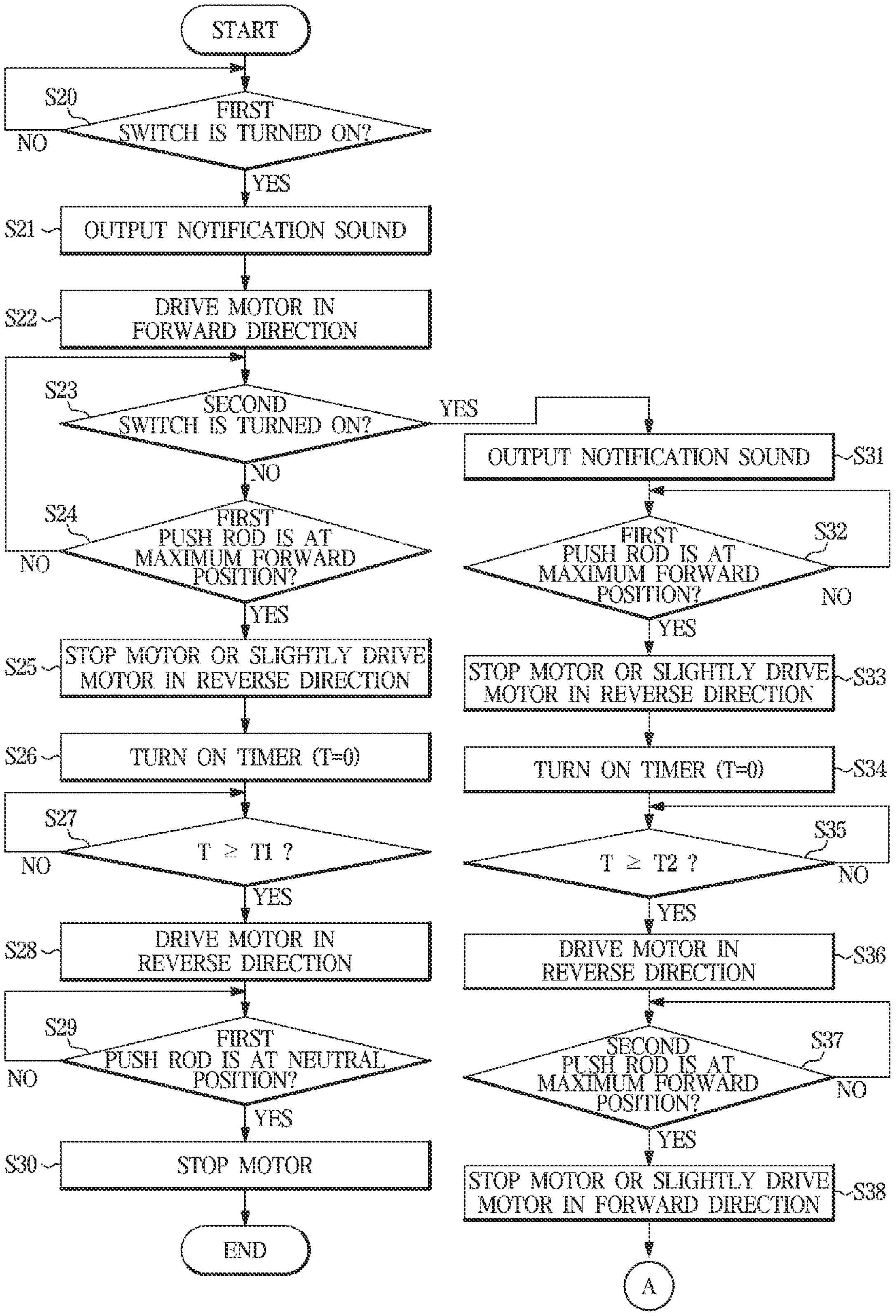
FIG. 17 is a control flowchart of the refrigerator according to an embodiment of the disclosure, particularly a part of the control flowchart including a state in which the second switch is turned on in the opening of the first door.
Figure 18:
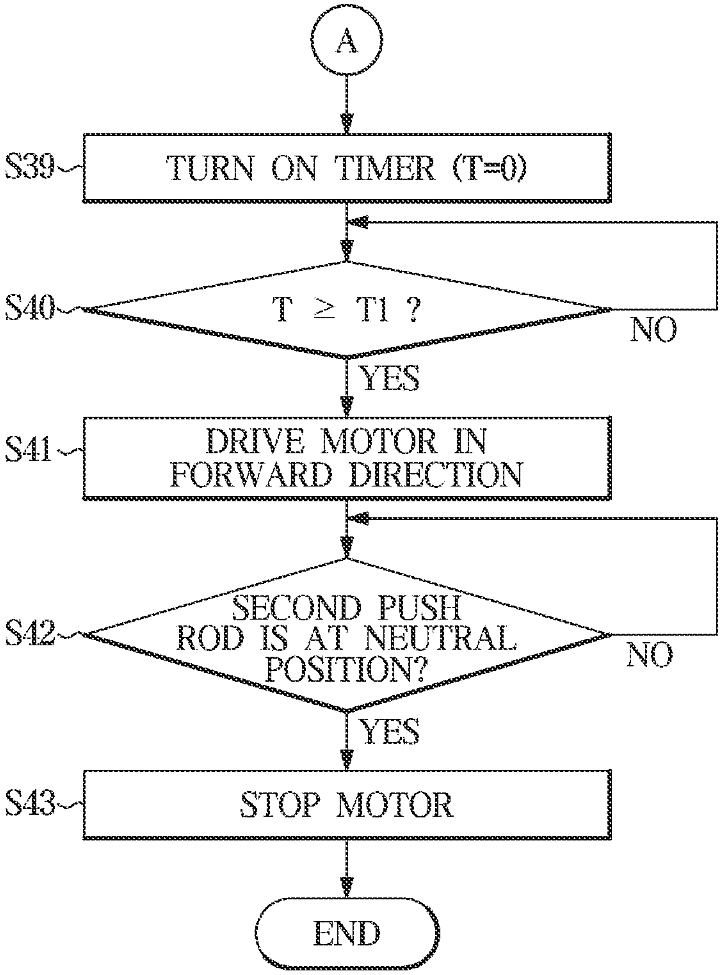
FIG. 18 is a control flowchart of the refrigerator according to an embodiment of the disclosure, particularly a remaining part of the control flowchart including a state in which the second switch is turned on in the opening of the first door.

FIG. 17 is a control flowchart of the refrigerator according to an embodiment of the disclosure, particularly a part of the control flowchart including a state in which the second switch is turned on in the opening of the first door. FIG. 18 is a control flowchart of the refrigerator according to an embodiment of the disclosure, particularly a remaining part of the control flowchart including a state in which the second switch is turned on in the opening of the first door.

According to an embodiment, the control method of the refrigerator may include outputting a notification sound (31), in which a notification sound is output through the speaker 160 in response to a user input being received by the second switch 270, in one of opening the first door (22 to 24), waiting the first door (25 to 27), and closing the first door (28 and 29).

Further, in one of the opening of the first door (22 to 24), the waiting of the first door (25 to 27), and the closing of the first door (28 and 29), the control method of the refrigerator may change a waiting time from a first reference waiting time T1 to a second reference waiting time T2 in response to a user input being received by the second switch 270. The second reference waiting time T2 may be less than the first reference waiting time T1.

According to an embodiment of the disclosure, it is possible to allow the first push rod 111 and the second push rod 112, which are interlocked, to move in opposite directions through one motor 150, and thus when the first push rod 111 moves forward and is in a withdrawn state, the second push rod 112 may move backward and in an inserted state. Accordingly, when a user input is received by the second switch 270 while the first push rod 111 is in the withdrawn state, it may take a time for the second push rod 112 to move forward to open the second door 22.

According to an embodiment of the disclosure, it is possible to make it difficult for a user to recognize a time delay by the control method of outputting a notification sound and reducing waiting time.

As an example, a control method in a case in which the second switch 270 is turned on in the opening of the first door (22 to 24) will be described with reference to FIGS. 17 and 18.

A detail description of a step the same as or similar to the above-mentioned control method may be omitted.

In response to the first switch 70 being turned on while the first push rod 111 and the second push rod 112 are in the neutral position, the controller 150 may output a notification sound through the speaker 160 (21). As the notification sound is output through the speaker 160, a user can recognize that the door opening device 100 starts to operate.

In response to receiving a user input from the first switch 70, the controller 150 may drive the motor 105 in the forward direction until the first push rod 111 reaches the forward position of the first push rod 111 from the neutral position of the first push rod 111 (22 to 24). As the motor 105 is driven in the forward direction, the first push rod 111 may move forward and the second push rod 112 may move backward. The first door 21 may be opened as the first push rod 111 moves forward to push the first door 21.

The controller 150 may determine whether the first push rod 111 reaches the maximum forward position through the position detection sensor 130 (24).

The controller 150 may determine whether the first push rod 111 reaches the maximum forward position and perform at least one of stopping the motor 105 or slightly moving the motor 105 in the reverse direction before the predetermined waiting time elapses from when the first push rod 111 reaches the maximum forward position of the first push rod (25 to 27). The slight movement of the motor 105 in the reverse direction may include driving the motor 105 at low speed (the first reference driving speed) in the reverse direction. The controller 150 may stop the motor 105 throughout the waiting time from when the first push rod 111 reaches the maximum forward position of the first push rod 111. In addition, the controller 150 may drive the motor 105 in the reverse direction at the first reference driving speed throughout the waiting time from when the first push rod 111 reaches the maximum forward position of the first push rod 111.

Alternatively, the controller 150 may stop the motor 105 for a part of the waiting time and move the motor 105 in the reverse direction at the first reference driving speed for the remaining part of the waiting time. For example, the controller 150 may stop the motor 105 for the second reference waiting time T2 from when the first push rod 111 reaches the maximum forward position of the first push rod 111, and after the second reference waiting time T2 elapses, the controller 150 may drive the motor 105 in the reverse direction at the first reference driving speed for the third reference waiting time corresponding to a difference between the first reference waiting time T1 and the second reference waiting time T2.

In response to the confirmation that the first push rod 111 reaches the maximum forward position by determining whether the first push rod 111 reaches the maximum forward position, the controller 150 may turn on the timer to set an elapsed time T as '0 (zero)' (26).

The controller 150 checks whether the elapsed time T of the timer is greater than or equal to a waiting time (27). The waiting time may be preset as a first reference waiting time T1.

In response to the confirmation that the elapsed time T of the timer is greater than or equal to the first reference waiting time T1, the controller 150 drives the motor 105 in the reverse direction (28). That is, the controller 150 may drive the motor 105 in the reverse direction at the second reference driving speed until the first push rod 111 returns to the neutral position of the first push rod 111 after the predetermined waiting time elapses from when the first push rod 111 reaches the maximum forward position of the first push rod 111. The second reference driving speed may be greater than the first reference driving speed. For example, the first reference driving speed may be 10% or less of the maximum speed of the motor 105, and the second reference driving speed may be about 60% of the maximum speed of the motor 105.

The controller 150 may detect the position of the first push rod 111 through the position detection sensor 130 to determine whether the first push rod 111 returns to the neutral position (29).

In response to the confirmation that the first push rod 111 reaches the neutral position, the controller 150 may stop the motor 105 (30).

As mentioned above, according to an embodiment, the control method of the refrigerator 1 may include the opening of the first door (22 to 24), the waiting of the first door (25 to 27), and the closing of the first door (28 and 29).

The controller 150 may determine whether a user input is received by the second switch 270 in the opening of the first door (22 to 24) (23). In response to the user input not being received by the second switch 270 in the opening of the first door (22 to 24), the control method may enter the step 25, and in response to the user input being received by the second switch 270 in the opening of the first door (22 to 24), the control method may enter a step 31.

In response to the user input being received by the second switch 270 in the opening of the first door (22 to 24), that is, while the controller 150 drives the motor 105 in the forward direction until the first push rod 111 reaches the maximum forward position of the first push rod 111 from the neutral position of the first push rod 111, the controller 150 may output a notification sound through the speaker 160 (31). Accordingly, a user can recognize that the door opening device 100 starts to operate, and it may be difficult for the user to recognize a delay time that is a time until the second door 22 is actually opened. Further, in response to the user input being received by the second switch 270 in the waiting of the first door (25 to 27), that is, while the controller 150 performs the at least one of stopping the motor 105 or driving the motor 105 in the reverse direction at the first reference driving speed before the predetermined waiting time elapses from when the first push rod 111 reaches the maximum forward position of the first push rod 111, the controller 150 may output a notification sound through the speaker 160.

Further, the controller 150 may change the waiting time in response to the user input being received by the second switch 270 while the controller 150 drives the motor 105 in the forward direction until the first push rod 111 reaches the maximum forward position of the first push rod 111 from the neutral position of the first push rod 111. Particularly, the controller 150 may change the waiting time from the first reference waiting time T1 to the second reference waiting time T2. The second reference waiting time T2 may be less than the first reference waiting time T1. Accordingly, the delay time until the second door 22 is opened may actually be reduced. For example, the first reference waiting time T1 may be 1 second, and the second reference waiting time T2 may be 0.5 second. Further, in response to the user input being received by the second switch 270 in the waiting of the first door (25 to 27), that is, while the controller 150 performs the at least one of stopping the motor 105 or driving the motor 105 in the reverse direction at the first reference driving speed before the predetermined waiting time elapses from when the first push rod 111 reaches the maximum forward position of the first push rod 111, the controller 150 may change the waiting time. Particularly, the controller 150 may change the waiting time from the first reference waiting time T1 to the second reference waiting time T2. The second reference waiting time T2 may be less than the first reference waiting time T1.

After the step 31, the controller 150 may determine whether the first push rod 111 reaches the maximum forward position through the position detection sensor 130 (32).

In response to the confirmation that the first push rod 111 reaches the maximum forward position by determining whether the first push rod 111 reaches the maximum forward position, the controller 150 may stop the motor 105 and may slightly move the motor 105 in reverse direction (33).

In response to the confirmation that the first push rod 111 reaches the maximum forward position by determining whether the first push rod 111 reaches the maximum forward position, the controller 150 may turn on a timer to set an elapsed time T as '0 (zero)' (34).

The controller 150 checks whether the elapsed time T of the timer is greater than or equal to a waiting time (35). Because the waiting time is changed from the first reference waiting time T1 to the second reference waiting time T2, the controller 150 may determine whether the elapsed time T of the timer is greater than or equal to the second reference waiting time T2.

In response to the second switch 270 being turned on in the opening of the first door (22 to 24), the first door 21 may wait for the second reference waiting time T2 in the waiting of the first door (33 to 35). In the waiting of the first door (33 to 35), the motor 105 may stop or slightly move in the reverse direction.

In response to the determination that the elapsed time T of the timer is greater than or equal to the second reference waiting time T2, the controller 150 drives the motor 105 in the reverse direction (36). In response to the user input being received by the second switch while the controller 150 drives the motor 105 in the forward direction until the first push rod 111 reaches the maximum forward position of the first push rod 111 from the neutral position of the first push rod 111, the controller 150 may drive the motor 105 in the reverse direction at the second reference driving speed until the second push rod 112 reaches the maximum forward position of the second push rod 112 from the neutral position of the second push rod 112 (36 and 37).

The controller 150 may determine whether the first push rod 111 reaches the maximum backward position of the first push rod 111 and whether the second push rod 112 reaches the maximum forward position of the second push rod 112 by detecting the position of the first push rod 111 through the position detection sensor 130 (37). That is, the controller 150 may determine whether the first push rod 111 reaches the maximum backward position of the first push rod 111 and whether the second push rod 112 reaches the maximum forward position of the second push rod 112 without determining whether the first push rod 111 reaches the neutral position.

In response to the confirmation that the second push rod 112 reaches the maximum forward position of the second push rod 112, the controller 150 may stop the motor 105 and may slightly move the motor 105 in the forward direction (38). According to the above control method, the driving of the motor 105 in the reverse direction at the second reference driving speed until the first push rod 111 returns to the neutral position of the first push rod 111, and the driving of the motor 105 in the reverse direction at the second reference driving speed until the second push rod 112 reaches the maximum forward position of the second push rod 112 from the neutral position of the second push rod 112 may be performed continuously. Therefore, the first push rod 111 may move directly from the maximum forward position of the first push rod 111 to the maximum backward position of the first push rod 111 without stopping at the neutral position of the first push rod 111, and the second push rod 112 may move directly from the maximum backward position of the second push rod 112 to the maximum forward position of the second push rod 112 without stopping at the neutral position of the second push rod 112.

In response to the confirmation that the first push rod 111 reaches the maximum backward position by determining whether the first push rod 111 reaches the maximum backward position, the controller 150 may turn on the timer to set the elapsed time T as '0 (zero)' (39). At this time, the waiting time may be reset to the first reference waiting time T1.

The controller 150 determines whether the elapsed time T of the timer is greater than or equal to the waiting time (40).

In response to the confirmation that the elapsed time T of the timer is greater than or equal to the first reference waiting time T1, the controller 150 drives the motor 105 in the forward direction (41).

The controller 150 may determine whether the first push rod 111 returns to the neutral position by detecting the position of the first push rod 111 through the position detection sensor 130 (42).

In response to the confirmation that the first push rod 111 reaches the neutral position, the controller 150 may stop the motor 105 (43).

As mentioned above, when a user input is received by the second switch 270 in the opening of the first door (22 to 24), the control method of the refrigerator 1 may include the outputting of the notification sound (31), the waiting of the first door (33 to 35), the closing of the first door and the opening of the second door (36 and 37), the waiting of the second door (38 to 40), and the closing of the second door (41 and 42).

The closing of the first door and the opening of the second door (36 and 37) may be continuously performed. Between the closing of the first door and the opening of the second door, the motor 105 may be continuously driven without stopping.

Further, as described in the above-mentioned control method, because the position of the first push rod 111 and the position of the second push rod 112 correspond to each other one-to-one, the determination of the controller 150 in which the first push rod 111 is in the maximum forward position may be the same as the determination in which the second push rod 112 is in the maximum backward position, the determination in which the first push rod 111 is in the maximum backward position may be the same as the determination in which the second push rod 112 is in the maximum forward position, and the determination in which the first push rod 111 is in the neutral position may be the same as the determination in which the second push rod 112 is in the neutral position.

Further, the controller 150 may drive the motor 105 to allow the first push rod 111 and the second push rod 112 to align with each other based on the position information of the first push rod 111 and the second push rod 112 detected by the position detection sensor 130, and the opening and closing information of the first door 21 and the second door 22 detected by the opening and closing sensors 141 and 142.

In the above description, the control method in a case where the second switch 270 is turned on in the opening of the first door (22 to 24) has been described. However, the same or similar control method may be applied even when the second switch 270 is turned on in the waiting of the first door (25 to 27), and even when the second switch 270 is turned on in the closing of the first door (28 and 29).

That is, in response to the second switch 270 being turned on in the waiting of the first door (25 to 27), the controller 150 may output the notification sound and change the waiting time to the second reference waiting time T2.

In response to the second switch 270 being turned on in the closing of the first door (28 and 29), the controller 150 may output the notification sound.

According to an embodiment, in response to a user input being received by the second switch 270 in one of the opening of the first door (22 to 24), the waiting of the first door (25 to 27), and the closing of the first door (28 and 29), the controller 150 may control the motor 105 to allow the speed of the motor 105 in the reverse direction to be increased in the closing of the first door and the opening of the second door (36 and 37).

The above-mentioned disclosure is not applied only to the above-described refrigerator, and may be applicable to a home appliance including a main body including a cavity, which is an internal space for performing a specific function, and a door configured to open and close the cavity, and the door thereof.

For example, the above-mentioned disclosure may be applied to a cooking appliance including a cooking chamber, a dishwasher including a washing chamber, a dryer including a drying chamber, a clothes treating apparatus including a clothes treating chamber, and an air conditioner including a heat exchange chamber in which a heat exchanger is disposed.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A control method of a refrigerator that includes a main body, a first door, a second door, a door opening device, a first switch, and a second switch, the main body including a storage compartment, the first door and the second door being rotatably coupled to the main body and being disposed in left and right directions so as to open and close the storage compartment, the door opening device including a motor configured to allow a first push rod and a second push rod to be interlocked with each other and moved in opposite directions, the first push rod being configured to press the first door, the second push rod being configured to press the second door, the first switch and the second switch being configured to receive a user input, the control method comprising:

in response to receiving a user input from the first switch, driving the motor in a forward direction until the first push rod reaches a maximum forward position of the first push rod from a neutral position of the first push rod;

performing at least one of stopping the motor or driving the motor in a reverse direction at a first reference driving speed before a predetermined waiting time elapses from when the first push rod reaches the maximum forward position of the first push rod;

driving the motor in the reverse direction at a second reference driving speed until the first push rod returns to the neutral position of the first push rod after the predetermined waiting time elapses from when the first push rod reaches the maximum forward position of the first push rod; and changing the predetermined waiting time from a first reference waiting time to a second reference waiting time, less than the first reference waiting time, in response to receiving a user input from the second switch while (a) the motor is driven in the forward direction until the first push rod reaches the maximum forward position of the first push rod from the neutral position of the first push rod or (b) while the at least one of stopping the motor or driving the motor in the reverse direction at the first reference driving speed is performed before the predetermined waiting time elapses from when the first push rod reaches the maximum forward position of the first push rod.

2. The control method of claim 1, wherein the changing comprises changing the predetermined waiting time from the first reference waiting time to the second reference waiting time in response to receiving the user input from the second switch while the motor is driven in the forward direction until the first push rod reaches the maximum forward position of the first push rod from the neutral position of the first push rod.

3. The control method of claim 1, wherein the performing comprises driving the motor in the reverse direction at the first reference driving speed before the predetermined waiting time elapses from when the first push rod reaches the maximum forward position of the first push rod, and the second reference driving speed is greater than the first reference driving speed.

4. The control method of claim 1, wherein the performing comprises:

stopping the motor throughout the predetermined waiting time from when the first push rod reaches the maximum forward position of the first push rod.

5. The control method of claim 1, wherein the performing comprises:

driving the motor in the reverse direction at the first reference driving speed throughout the predetermined waiting time from when the first push rod reaches the maximum forward position of the first push rod.

6. The control method of claim 1, wherein the performing comprises:

stopping the motor for the second reference waiting time from when the first push rod reaches the maximum forward position of the first push rod; and driving the motor in the reverse direction at the first reference driving speed for a third reference waiting time, which is a difference between the first reference waiting time and the second reference waiting time, after the second reference waiting time elapses from when the first push rod reaches the maximum forward position of the first push rod.

7. The control method of claim 1, wherein the first reference waiting time and the second reference waiting time are set by a user.

8. The control method of claim 1, further comprising:

in response to receiving the user input from the second switch, driving the motor in the reverse direction at the second reference driving speed until the second push rod reaches a maximum forward position of the second push rod from a neutral position of the second push rod.

9. The control method of claim 8, wherein driving the motor in the reverse direction at the second reference driving speed until the first push rod returns to the neutral position of the first push rod, and driving the motor in the reverse direction at the second reference driving speed until the second push rod reaches the maximum forward position of the second push rod from the neutral position of the second push rod are continuously performed.

10. The control method of claim 1, wherein the changing comprises changing the predetermined waiting time in response to receiving the user input from the second switch while the at least one of stopping the motor or driving the motor in the reverse direction at the first reference driving speed is performed before the predetermined waiting time elapses from when the first push rod reaches the maximum forward position of the first push rod.

11. The control method of claim 1, further comprising:

outputting a notification sound through a speaker in response to receiving the user input from the second switch while the motor is driven in the forward direction until the first push rod reaches the maximum forward position of the first push rod from the neutral position of the first push rod.

12. The control method of claim 1, further comprising:

outputting a notification sound through a speaker in response to receiving the user input from the second switch while the at least one of stopping the motor or driving the motor in the reverse direction at the first reference driving speed is performed before the predetermined waiting time elapses from when the first push rod reaches the maximum forward position of the first push rod.

13. A refrigerator comprising:

a main body including a storage compartment;

a first door and a second door rotatably coupled to the main body and disposed in left and right directions so as to open and close the storage compartment;

a door opening device including a first push rod configured to move so as to press a rear surface of the first door, a second push rod configured to move so as to press a rear surface of the second door, and a motor configured to allow the first push rod and the second push rod to be interlocked with each other and moved in opposite directions, and configured to be driven in a forward and reverse direction;

a first switch configured to receive a user input for opening the first door;

a second switch configured to receive a user input for opening the second door; and a controller configured to control the motor, wherein the controller is configured to:

in response to receiving the user input from the first switch, drive the motor in a forward direction until the first push rod reaches a maximum forward position of the first push rod;

perform at least one of stopping the motor or driving the motor in a reverse direction at a first reference driving speed before a predetermined waiting time elapses from when the first push rod reaches the maximum forward position of the first push rod;

drive the motor in the reverse direction at a second reference driving speed until the first push rod returns to a neutral position of the first push rod after the predetermined waiting time elapses from when the first push rod reaches the maximum forward position of the first push rod; and change the predetermined waiting time from a first reference waiting time to a second reference waiting time, less than the first reference waiting time, in response to receiving the user input from the second switch while (a) the motor is driven in the forward direction until the first push rod reaches the maximum forward position of the first push rod from the neutral position of the first push rod, or (b) while the at least one of stopping the motor or driving the motor in the reverse direction at the first reference driving speed is performed before the predetermined waiting time elapses from when the first push rod reaches the maximum forward position of the first push rod.

14. The refrigerator of claim 13, further comprising a speaker configured to output a notification sound, wherein the controller is configured to output the notification sound through the speaker in response to receiving the user input from the second switch while the motor is driven in the forward direction until the first push rod reaches the maximum forward position of the first push rod from the neutral position of the first push rod.

15. The refrigerator of claim 13, wherein the door opening device further comprises a position detection sensor configured to detect a position of at least one from among the first push rod and the second push rod.

16. The refrigerator of claim 15, further comprising:

an opening and closing sensor configured to detect whether the first door and the second door are either opened or closed, wherein the controller is further configured to drive the motor to allow the first push rod and the second push rod to align with each other based on (i) position information of the first push rod and the second push rod that is detected by the position detection sensor, and (ii) opening and closing information of the first door and the second door that is detected by the opening and closing sensor.

17. The refrigerator of claim 13, further comprising:

a hinge disposed on a lower end of the main body that is configured to rotatably support the first door; and a cam unit configured to allow the first door to be closed by its own weight in response to the first push rod moving from the maximum forward position of the first push rod to the neutral position of the first push rod by the motor driven in the reverse direction, the cam unit comprising a door cam disposed on a lower end of the first door; and a hinge cam disposed in the hinge to correspond to the door cam.

* * * * *